United States Patent
Suckling et al.

(10) Patent No.: US 9,200,780 B2
(45) Date of Patent: Dec. 1, 2015

(54) LIGHT SOURCE FOR AN AUTOMOTIVE HEADLIGHT WITH ADAPTIVE FUNCTION

(71) Applicant: SHARP KABUSHIKI KAISHA, Osaka (JP)

(72) Inventors: James Rowland Suckling, Surrey (GB); David James Montgomery, Oxford (GB); Sarah Anne Mitchell, Oxford (GB); Koji Takahashi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 58 days.

(21) Appl. No.: 13/948,744

(22) Filed: Jul. 23, 2013

(65) Prior Publication Data

US 2014/0029281 A1    Jan. 30, 2014

(30) Foreign Application Priority Data

Jul. 26, 2012    (GB) .................................. 1213301.3

(51) Int. Cl.
| | |
|---|---|
| F21V 9/16 | (2006.01) |
| F21V 13/14 | (2006.01) |
| F21S 8/10 | (2006.01) |
| B60Q 1/04 | (2006.01) |
| B60Q 1/14 | (2006.01) |

(52) U.S. Cl.
CPC ... *F21V 9/16* (2013.01); *B60Q 1/04* (2013.01); *B60Q 1/143* (2013.01); *F21S 48/1225* (2013.01); *F21S 48/1747* (2013.01); *F21V 13/14* (2013.01); *B60Q 2300/21* (2013.01); *B60Q 2300/42* (2013.01); *B60Q 2300/45* (2013.01)

(58) Field of Classification Search
CPC ..... G02B 6/0003; F21V 9/16; F21S 48/1163; F21S 48/17; F21S 48/137
USPC .......................................................... 362/516
See application file for complete search history.

(56) References Cited

U.S. PATENT DOCUMENTS

| | | | |
|---|---|---|---|
| 4,722,037 A * | 1/1988 | Davis | 362/231 |
| 7,654,712 B2 | 2/2010 | Takeda et al. | |
| 7,845,839 B2 * | 12/2010 | Collier | 362/606 |
| 8,004,172 B2 * | 8/2011 | Hussell et al. | 313/488 |
| 8,256,941 B2 * | 9/2012 | Hikmet et al. | 362/513 |

(Continued)

FOREIGN PATENT DOCUMENTS

| | | |
|---|---|---|
| DE | 10 2010 062 463 A1 | 6/2012 |
| EP | 1857 729 A1 | 11/2007 |

(Continued)

*Primary Examiner* — Anh Mai
*Assistant Examiner* — Matthew J Peerce
(74) *Attorney, Agent, or Firm* — Renner, Otto, Boisselle & Sklar, LLP

(57) ABSTRACT

A light source system operable in at least first and second modes to provide at least and first and second different far field illumination patterns, the system comprising: a photoluminescent material; and a light beam generator for generating, in the first mode, a first set of light beams for illuminating respective first regions of the photoluminescent material and for generating, in the second mode, a second set of light beams for illuminating respective second regions of the photoluminescent material, the first and second sets of light beams being independently controllable. In the first mode, the light beam generator generates the first set of light beams such that a first beam of the first set of light beams illuminates a first illumination region of the photoluminescent material having one side that is inclined with respect to another side of the illumination region.

19 Claims, 19 Drawing Sheets

(56) References Cited

U.S. PATENT DOCUMENTS

| | | | |
|---|---|---|---|
| 8,439,536 B2 * | 5/2013 | Sato et al. | 362/510 |
| 2005/0105301 A1 | 5/2005 | Takeda et al. | |
| 2011/0249460 A1 * | 10/2011 | Kushimoto | 362/510 |
| 2012/0026721 A1 * | 2/2012 | Kurt et al. | 362/84 |
| 2012/0106183 A1 | 5/2012 | Takahashi | |
| 2013/0003400 A1 * | 1/2013 | Kijima et al. | 362/517 |
| 2013/0058114 A1 * | 3/2013 | Reiners | 362/510 |
| 2013/0094179 A1 * | 4/2013 | Dai et al. | 362/84 |
| 2013/0208442 A1 * | 8/2013 | Reiherzer | 362/84 |
| 2013/0265561 A1 * | 10/2013 | Takahira et al. | 356/3 |

FOREIGN PATENT DOCUMENTS

| | | |
|---|---|---|
| JP | 2010-232044 A | 10/2010 |
| JP | 2011-134619 A | 7/2011 |
| JP | 2011-204406 A | 10/2011 |
| JP | 2011-222260 A | 11/2011 |
| WO | WO 2009/131126 A1 | 10/2009 |
| WO | WO 2009131126 A1 * | 10/2009 |
| WO | WO 2013/094222 A1 | 6/2013 |

* cited by examiner

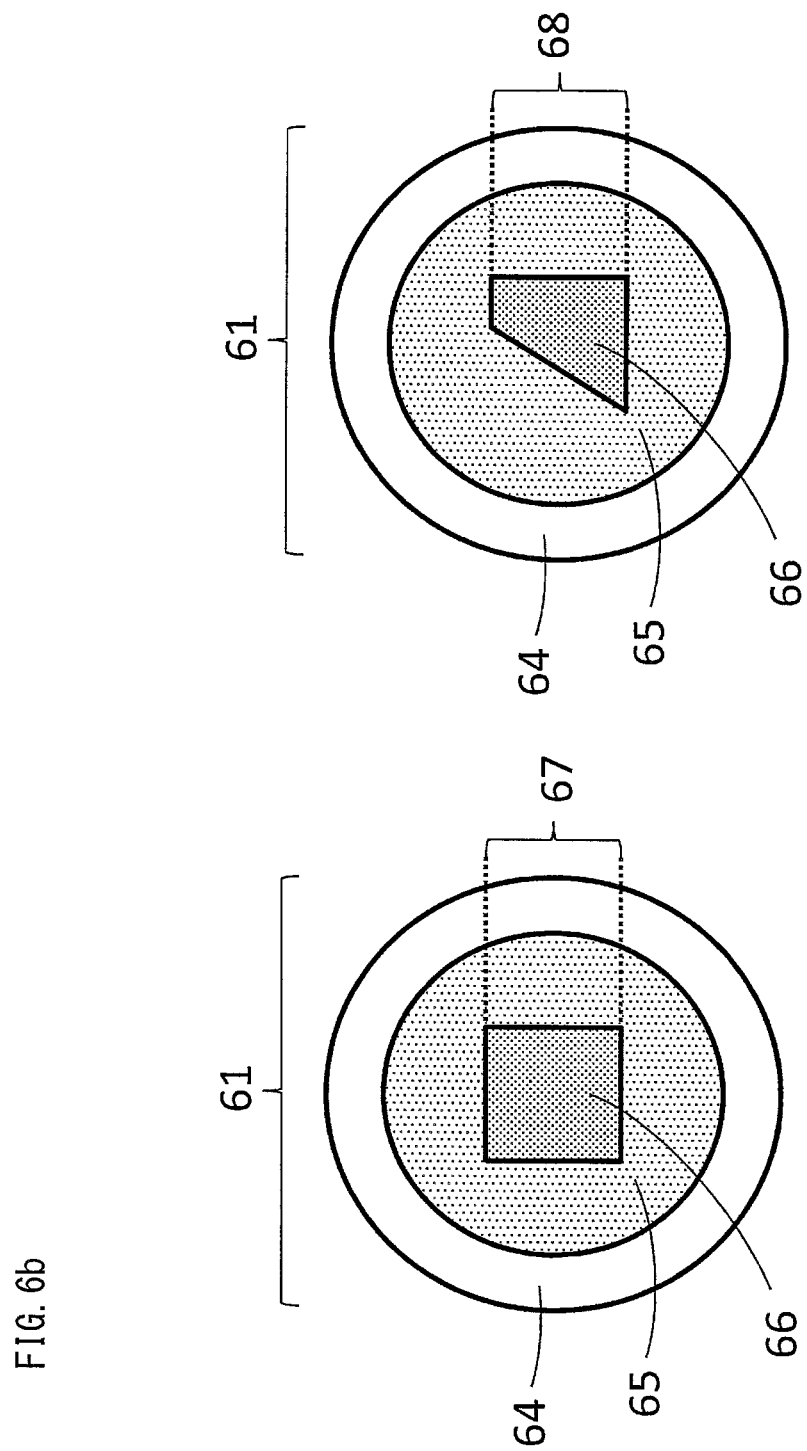

LIGHT SOURCE FOR AN AUTOMOTIVE HEADLIGHT WITH ADAPTIVE FUNCTION

This Nonprovisional application claims priority under 35 U.S.C. §119(a) on Patent Applications No. 1213301.3 filed in United Kingdom on Jul. 26, 2012, the entire contents of which are hereby incorporated by reference.

TECHNICAL FIELD

The present invention relates to a light source for a non-mechanically switchable headlight system for the provision of an illumination pattern on the road which may be adapted to best suit driving conditions.

BACKGROUND ART

The application of lighting to the automotive industry is well known. The original electric light sources were filament bulbs which offered high luminance from a small source. Improvements in light source design led to halogen type filament bulbs, high intensity discharge (HID) bulbs or high brightness light emitting diodes (LED). These offer improvement in terms of luminance and energy use over preceding filament bulbs. In order to apply these light sources to automotive front lighting and realise the beam spot distributions required by regulatory bodies, such as the United Nations Economic Commission for Europe (UNECE) or Federal Motor Vehicle Safety Standards (FMVSS), for the U.S.A, modification of the output beam to form specific beam spot distributions on the road is necessary. For projector headlights this requires removal of a portion of the light from the projected beam which ultimately forms the beam spot, to create a dipped beam. The dipped beam is necessary to avoid causing glare to oncoming road users. By necessity, the dipped beam also creates a restricted view of the road due to restricted illumination of the same. The removal of light is performed by a shield, which is inserted into the light path thereby causing a reduction in optical efficiency of the projector headlight.

The filament and discharge light sources provide no means for modification of the output from the source. Therefore, a shield is the only method of providing the dipped beam spot distribution pattern. To switch between a dipped beam and a driving beam, the beam pattern that is necessary for better visibility, either two headlights must be provided, one to create the dipped beam and the other to create the driving beam, or a mechanical switching mechanism must be provided. When the driving beam is desired, the mechanical switching mechanism removes the shield from the projected beam profile allowing all light to exit the projector headlight unit unimpeded.

The provision of only a dipped beam distribution, or of only a driving beam distribution, has limitations in terms of road user safety by not providing simultaneous optimal illumination of the road and minimal glare to other road users. This can be improved upon by the addition of an adaptive element to the projected headlight beam. However, all methods of creating an adaptive beam spot from a single projector unit require mechanical moving components within the headlight unit. This has a limitation on cost reduction and reliability of the headlight over the course of its lifetime. Alternative methods of provision of an adaptive beam spot require multiple light source units, which increases the headlight cost, and which also have a large volume, this having implications for pedestrian safety in the event of a collision.

Laser based light sources offer advantage over existing light sources due to the ability to control the emission from the laser diode effectively using optics with a much reduced size, and therefore, weight. This control ability stems from the small emission area and restricted angular distribution of the laser diode. The light emitted from laser diodes is often illuminated onto a photoluminescent material to convert from the first wavelength to a second wavelength, which is predominantly white. The light source created is very small and can be used more efficiently with headlight projection optics.

The following background art describes the use of lasers in adaptive automotive headlight units:

JP 2011-222260 (Sharp, 8 Apr. 2010); this is illustrated in FIG. 1. This patent discloses laser illumination of a phosphor 11. The phosphor is shaped in the form of a passing beam distribution suitable for a car headlight. One surface of the phosphor 12 is excited by laser light optically conducted by fibres, and emitted from the fibre ends 13. The required headlight passing beam illumination pattern may optionally be reinforced with an optical shield with the same low-beam profile as the phosphor.

JP 2010-232044A (Stanley Electric, 27 Mar. 2009); an illustration of this patent is shown in FIG. 2. This patent discloses a lamp for a vehicle 21 consisting of a plurality of light emitting diode (LED) light sources 22, a phosphor 23 and a shade 24. The phosphor 23 emits white light in response to excitation from a laser light source. The light distribution created by the combination of the LED 22, phosphor 23 and shade 24 is imaged through a convex lens 25 to form a dipped beam spot distribution on the road. The invention provides for a dipped beam spot distribution only from this light source.

US 2012-0106183 (Sharp, 29 Oct. 2010); an illustration of the patent is shown in FIG. 3. The patent discloses a system where the distribution of illumination intensity on a phosphor varies with position from the focal point of a projection optical system. The illumination at or near the focal point, 31, may be controlled independently of the intensity of illumination at the periphery of the phosphor, 32, away from the focal point. Projection optics may be used to project the phosphor illumination distribution into an illumination pattern of varying intensity on a road or other target.

U.S. Pat. No. 7,654,712 B2 (Koito Manufacturing, 28 Jun. 2006); an illustration of this patent is shown in FIG. 4. This patent discloses a lamp module 41 formed from multiple elements formed from a fluorescent substance 42 excited by individual light emission parts 43 to emit white light. The fluorescent emission from the fluorescent substance 42 is collimated by a plurality of micro lenses 44. This light can then be projected by another lens to form a beam spot. This has the capability to form an adaptive beam spot.

SUMMARY OF INVENTION

A first aspect of the present invention provides a light source system operable in at least first and second modes to provide at least and first and second different far field illumination patterns, the system comprising: a photoluminescent material; and a light beam generator for generating, in the first mode, a first set of one or more light beams for illuminating respective first regions of the photoluminescent material and for generating, in the second mode, a second set of one or more light beams for illuminating respective second regions of the photoluminescent material, the first and second sets of light beams being independently controllable; wherein in the first mode, the light beam generator generates the first set of light beams such that a first beam of the first set of light beams illuminates a first illuminated region of the photoluminescent material having one side that is inclined with respect to another side of the illuminated region. That is, the first beam is so shaped in cross-section that it generates an illuminated region on the of the photoluminescent material, with the illuminated region having one side that is inclined with respect to another side of the illuminated region.

For the avoidance of doubt, the first set of light beams and/or the second set of light beams may consist of only a single light beam.

By "inclined" is meant that the angle between the two sides is not 90° (and is not zero). Preferably, the term "inclined" denotes that the angle between the two sides is within a range which is less than 75° and greater than 15°, more preferably that the angle between the two sides is within a range which is less than 60° and greater than 30°, and even more preferably that the angle is equal to or is close to 45°.

By specifying that the sets of light beams are independently controllable is meant that the intensity of the light beam(s) of one set is controllable independently of the intensity of the light beam(s) of the other set, and optionally that the or any light beam of one set is controllable independently of the intensity of the or any light beam of the other set. (It should be noted that the region of the photoluminescent material that is illuminated by one set of light beams may or may not overlap the region of the photoluminescent material that is illuminated by another set of light beams.)

The photoluminescent material may be a fluorescent material, such as a fluorescent phosphor.

For the avoidance of doubt, the term "phosphor" as used herein includes a nanophosphor.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features:

FIG. 6b: detail of possible shaped cores for the optical fibres.

Figure 1:
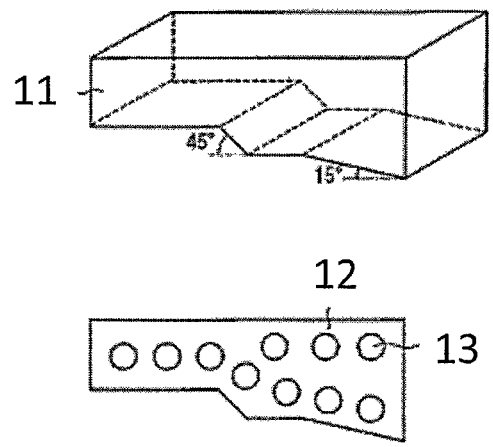
FIG. 1: example of laser based headlight light source with a shape corresponding to a passing beam distribution, constituting a conventional art.
Figure 2:
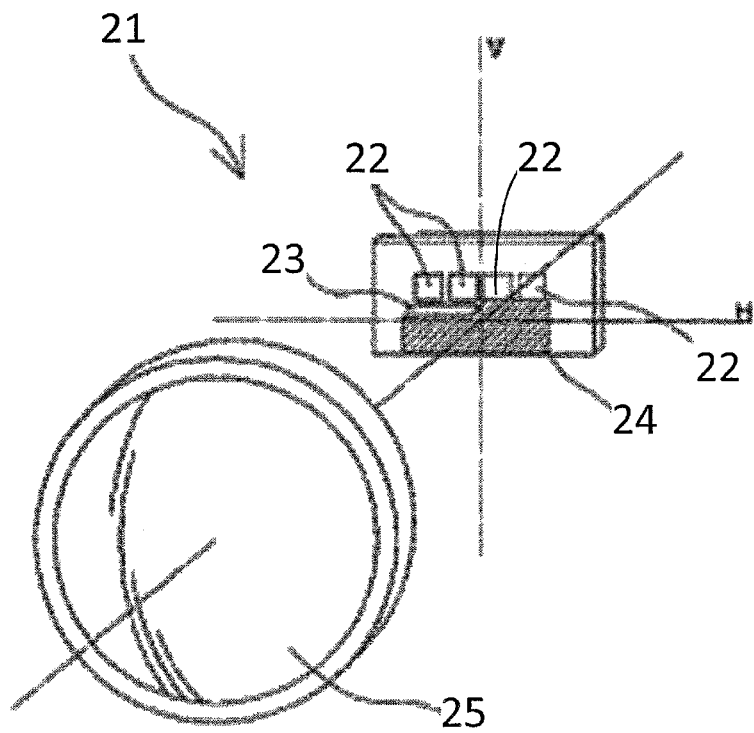
FIG. 2: example of a laser based headlight light source with a shape corresponding to a passing beam distribution, constituting a conventional art.
Figure 3:
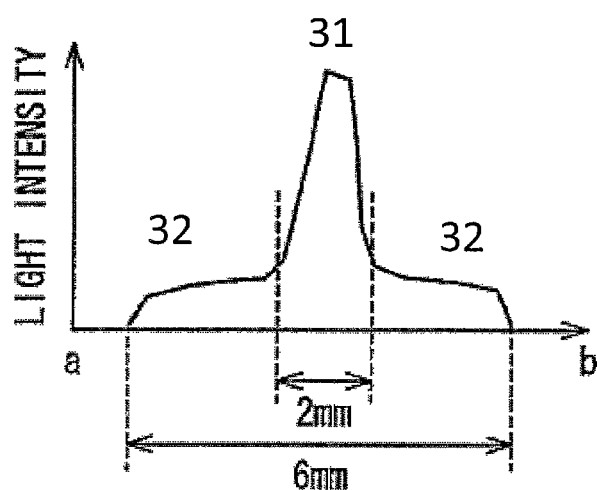
FIG. 3: example of a laser based headlight light source with a brightness distribution upon the light source which varies as a function of position depending on distribution required in the beam spot, constituting a conventional art.
Figure 4:
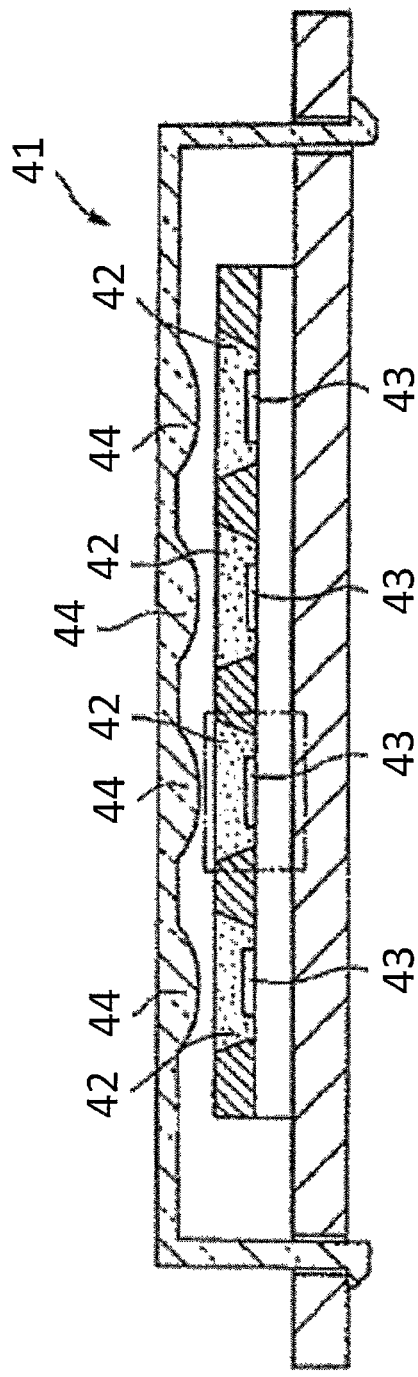
FIG. 4: example of a laser based headlight light source with a controllable brightness distribution as a function of position, constituting a conventional art.

DESCRIPTION OF REFERENCE NUMERALS 11. phosphor (prior art 1)
12. surface of the phosphor (prior art 1)
13. fibre ends (prior art 1)
21. lamp for a vehicle (prior art 2)
22. light emitting diode light sources (prior art 2)
23. phosphor (prior art 2)
24. shade (prior art 2)

25. convex lens (prior art 2)
31. illumination at or near the focal point (prior art 3)
32. phosphor (prior art 3)
41. lamp module (prior art 4)
42. fluorescent substance (prior art 4)
43. micro lens (prior art 4)
51. laser light sources
52. laser emitters
53. heat sink
54. light beams
55. light source
56. photoluminescent material
57. substrate
58. illumination regions
59. secondary light
510. optical system
511. primary lens
512. rectangular shape
513. array
514. boundary
515. rectilinear shape
516. trapezoidal shape
517. triangular shape
518. diagonal patterned fill
519. horizontal edge
520. raised section
521. diagonal edge
522. vertical marker
523. elbow
524. shoulder
525. beam spot distribution
526. rectilinear outline
527. trapezoidal outline
528. beam spot elbow
529. beam spot shoulder
530. beam spot cut-off
531. vertical patterned fill
532. dotted pattern fill
533. horizontal pattern fill
534. meeting point
535. curved diagonal edge
61. optical fibre
62. output face
63. imaging lens
64. sleeve
65. cladding
66. core
67. rectilinear shaped core
68. trapezoidal shaped core
71. centre (of the light source)
72. edge (of the light source)
73. centre illumination regions
74. edge illumination regions
81. opposing illumination region
82. far edge
91. top half (of light source)
92. parallelogram shapes
101. further illumination region
111. alphanumeric illumination region
112. illumination sub-spot
121. projection optical system
122. ellipsoidal reflector
123. projection lens
124. first focal point
125. second focal point
126. focal plane
127. focal length
128. principal plane
131. hyperbolic reflector
151. headlight unit
152. automobile
153. central control unit
154. beam spot distribution on the road
155. road
156. driver console
157. camera
158. oncoming automobile
159. pedestrian

DETAILED DESCRIPTION OF INVENTION

The main embodiment of the present invention is described herein. An overview of the method of operation is presented in FIG. 5a. A group of laser light sources 51 is comprised of an array of multiple individual laser emitters 52. The laser emitters 52 may be mounted on a heat sink 53 if necessary. From herein the heat sink 53 will be omitted from figures for clarity, but may always be associated with laser emitters 52 or a laser emitter array 51. The laser emitters 52 emit light beams 54 of a first waveband. The light beams 54 of the first waveband from the laser emitters 52 are directed onto a light source 55 comprising a photoluminescent material 56 which is deposited onto a substrate 57. The following description will assume that the number of light-emitting devices is equal to the number of light beams, ie that each light-emitting device generates, when ON, a single beam light incident on the photoluminescent material. The invention is not however limited to this. From herein the light source 55 will generally be shown as one object. The individual light beams 54 form an array of illumination regions 58 on the light source 55 which are distinct, but not separated from one another. By "illumination region" is meant an area of the light source that corresponds to, and is capable of being illuminated by, one or more of the light beams 54. When the light beam(s) corresponding to an illumination region are generated, ie when the corresponding light-emitting device(s) are ON, the illumination region is illuminated over its entire area (and may then be considered as an "illuminated region"). The light beam(s) corresponding to an illumination region do not significantly illuminate, when ON, any other of the illumination regions.

The illumination regions 58 are formed into particular shapes; the shapes and configuration of the illumination regions 58 will be described herein. The laser emitters 52 may be applied with other optical components in such a manner as to achieve the desired shaped illumination regions 58. The extra optical components are not shown in FIG. 5a for clarity, but will be described herein in connection with later figures. By way of example, the optical components may comprise optical fibres or top hat lenses. An optical fibre, for example, may have a core that is shaped similarly to the desired shape of an illumination region on the photoluminescent material— for example an optical fibre with a square core will generate an illumination region on the photoluminescent material that is generally square in shape, etc. The number of light-emitting devices may be the same as the number of optical components, with each light-emitting device illuminating a single optical component and each optical component receiving light from a single light-emitting device. This provides that greatest possible degree of control over the regions of the photoluminescent material that are illuminated. The invention is not however limited to a one-to-one correspondence between the optical components and the light-emitting devices. The photoluminescent material 56 converts the light of the first waveband into light of a second or more wavebands with longer wavelength. The secondary light 59 of the second waveband, emitted from the light source 55, is collected by an optical system 510 which images the light source 55 into the far field. The optical system 510 is shown as a primary lens 511 in this embodiment for illustrative purposes, but should not be limited to one such type of image forming apparatus. The optical system 510 is provided to image and magnify the light source 55 into a far-field beam spot.

For the purposes of description of the present invention, when describing the light source 55, it is understood that the term "illumination region" is directly equivalent to "emission spot" as the light source 55 only emits light of the second or more wavebands from a position illuminated by light of the first waveband from the laser emitters 52 and that emission of light from the light source 55 is otherwise not possible. Therefore, discussion of illumination from the laser emitters 52, or discussion of illumination regions 58, implicitly indicates locations of secondary light 59 emission from the light source 55.

The laser emitters 52 may be replaced with other semiconductor light emitters, for example light emitting diodes (LED) which are applied with a suitable collimating optic to direct the light from the LED onto the photoluminescent material 56 of the light source 55. Use of such LEDs will result in a headlight which is significantly larger than one constructed using laser emitters.

The photoluminescent material 56 may be made from phosphors and deposited on the substrate 57 in a thin layer, the manufacture of which is well known and will not be disclosed further within this invention. The constituent parts of the photoluminescent material 56 may vary depending on the wavelength of the first waveband and hence the formation of the second or more wavebands of light may be via two routes. Firstly, the light of the first waveband may be non-visible, or have a wavelength such that it generates a very low response in the human eye, such wavelengths being 415 nm or shorter. In this instance, the photoluminescent material 56 may be constituted of a combination of two or more of red, green, blue or yellow phosphors which are caused to emit light within the red, green, blue or yellow second wavebands respectively when illuminated by light of 415 nm or shorter. The combination of two or more of the aforementioned second wavebands, but excluding the first waveband produced by the laser emitter, may be mixed to produce light perceived as white. The second method of producing white light via the use of a first waveband in the range 430 nm to 470 nm and a combination of one or more of a red, green or yellow phosphor which is caused to emit light within the red, green or yellow second wavebands respectively when illuminated by light within the range of 430 nm to 470 nm. The combination of the part of light of the first waveband that is not absorbed by the photoluminescent material and one or more of the second wavebands produces light with a colour perceived as white.

The laser sources or other light sources are operable in at least first and second modes in which they generate respectively, first and second independently controllable sets of light beams for illuminating respective regions of the photoluminescent material. For example a first set of the laser sources or other light sources may be switched ON in the first mode to generate the first set of light beams and a second, different set of the laser sources or other light sources may be switched ON in the second mode to generate the second set of light beams.

Figure 5A:
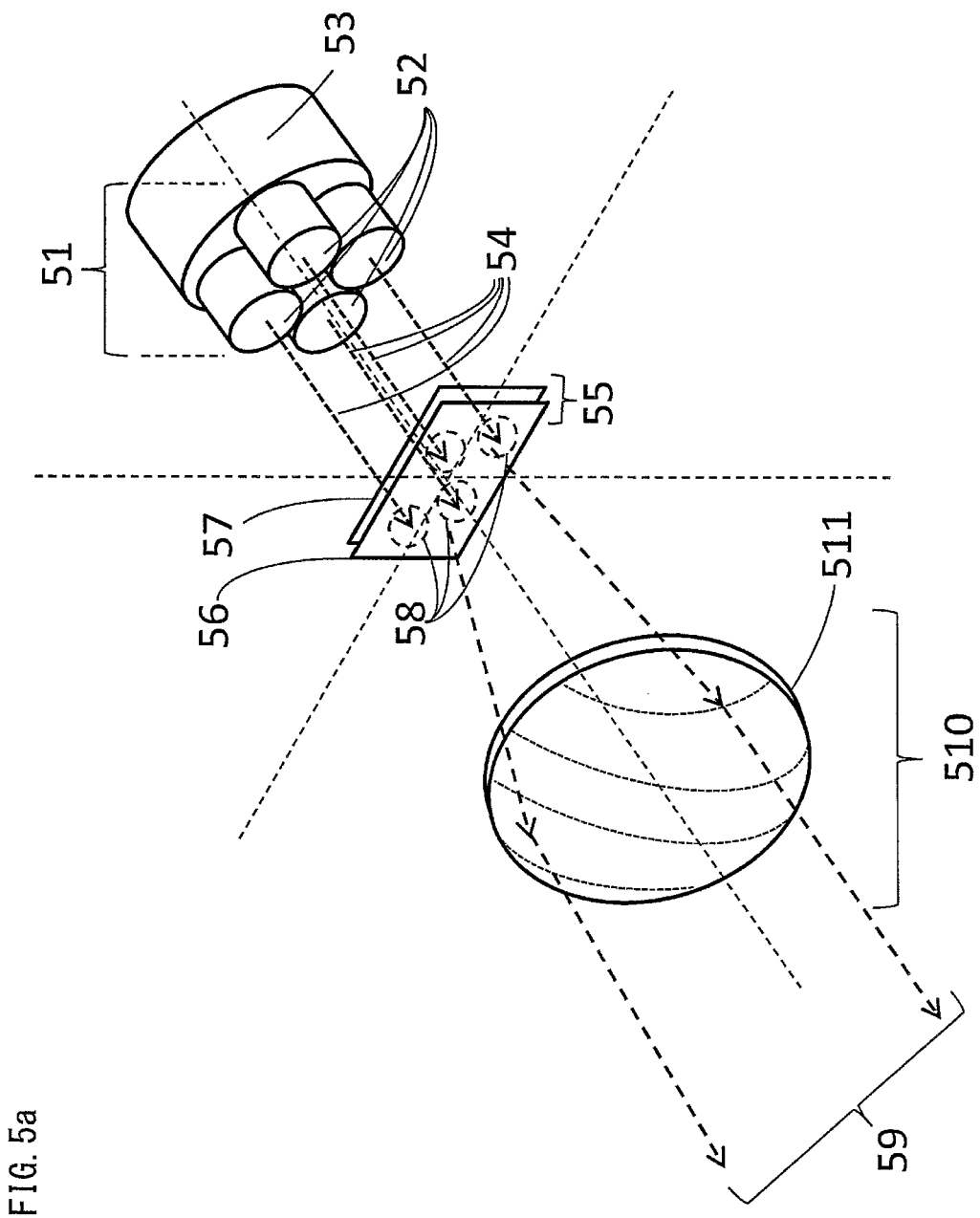
FIG. 5a: overview of the main embodiment of the present invention.
Figure 5B:
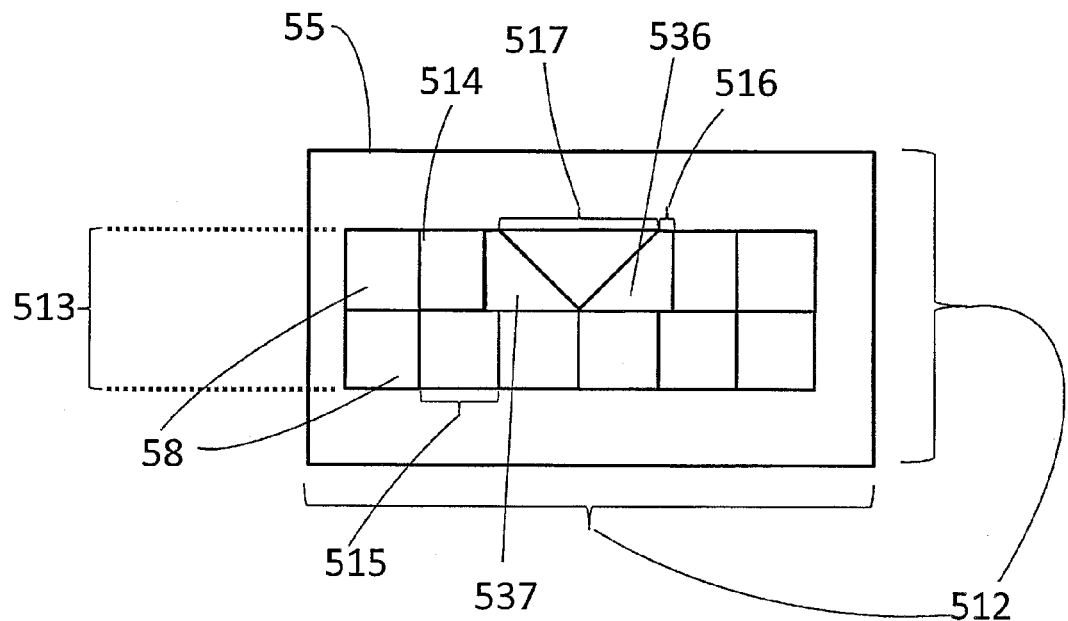
FIG. 5b: plan view of the light source comprising the present invention.

FIG. 5b shows a plan view of the light source 55. The light source 55 is formed by a deposition of photoluminescent material 56 upon a substrate with rectangular shape 512. Detail of the configuration of the illumination regions 58 upon the light source 55 is shown. The illumination regions 58 are arranged in an array 513 of abutting shapes to form a brightness distribution without gaps at the boundaries 514 between the individual illumination regions 58. Any gaps shown in FIG. 5b are an artefact of the drawing and not intended as an illustration of a gap in the array 513 of illumination regions 58 of the present invention. To achieve the array 513 without gaps at the boundaries 514 the shapes must consist of those capable of such arrangement. To that end, the shapes shown here are rectilinear 515, trapezoidal 516 and triangular 517. However, the shapes should not be limited to such and other shapes will be described herein. The array 513 is formed into a shape which is not limited to being the same as that of light source 55. Although it is most cost effective to use a light source 55 with the same area as the intended array 513 it is not a necessary requirement. The array 513 in this particular figure is formed into a shape that is capable of meeting the automotive regulations governing the formation of beam spot upon a road surface. In particular, the array 513 is shaped so as to be capable of forming the beam spots required for either left hand or right hand passing beam, or the driving beam. This is by way of example and the configuration of the shapes within the array 513 should not be limited to such. For example, other array configurations may include ones that can achieve solely the right hand drive passing beam or left hand drive passing beam and beams with further adaptive function; all of these will be described in further details in further embodiments.

Figure 5C:
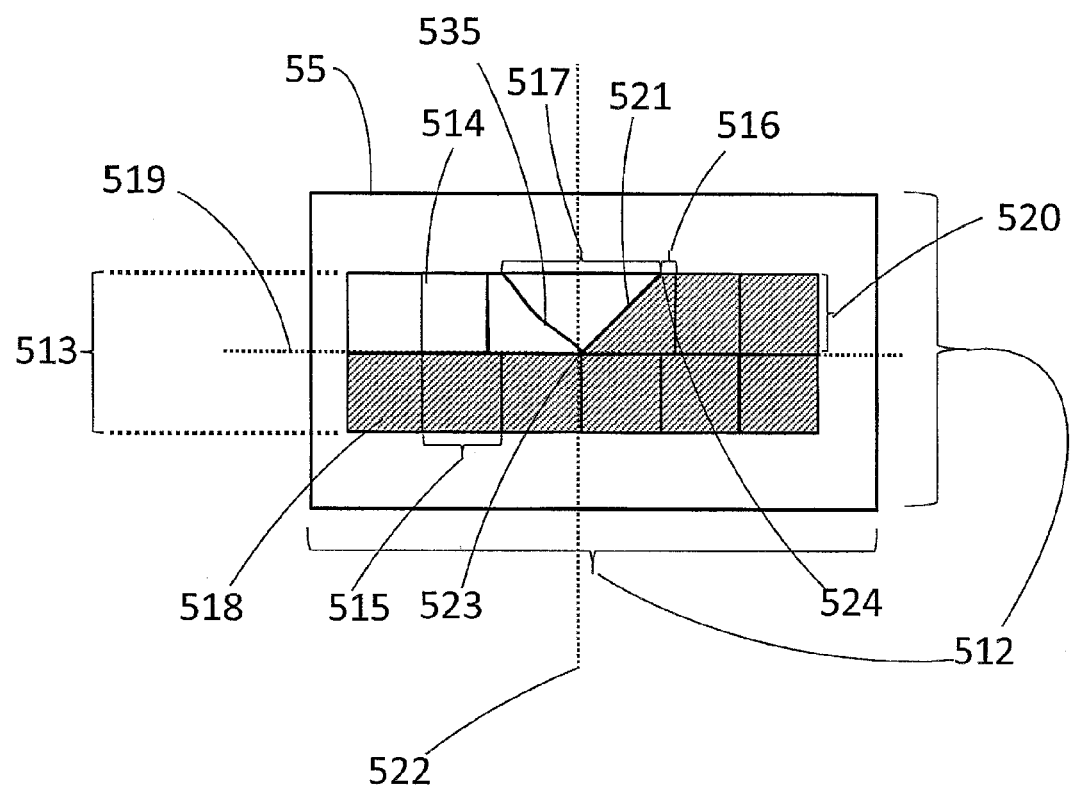
FIG. 5c: plan view of the light source with detail of illumination required for a passing beam distribution for right hand drive vehicles.

FIG. 5c shows the particular configuration of illumination required to achieve the right hand passing beam spot. The illumination regions that are required to be illuminated to achieve the right hand passing beam spot are highlighted by the diagonal patterned fill 518.—in a first mode of operation of the light source system of FIG. 5a, a first set of the laser emitters 52 may be turned on so that the illumination regions highlighted by the diagonal patterned fill 518 in FIG. 5c are illuminated by their associated light beams, while other illumination regions are not illuminated. The array 513 of illumination regions is formed from illumination regions with shapes that allow the formation of an overall illuminated area (corresponding to the diagonal patterned fill 518 in FIG. 5c) that has a horizontal edge 519 over which a raised section 520 is positioned to the right hand side. The raised section 520 rises from the horizontal edge 519 by means of a diagonal edge 521 which is located on the right hand side of the vertical marker 522. Therefore, the array 513 must be comprised of illumination regions in which at least one illumination region 536 (see FIG. 5b) has one side that is inclined with respect to another side of the illumination region to thereby provide the diagonal edge 521. The at least one illumination region 536 may have first and third sides that are inclined with respect to a second side—in FIG. 5c the diagonal edge 521 is an edge of an illumination region shaped as a trapezoid, so that the two adjacent sides of the illumination region are both inclined with respect to the diagonal edge 521.

The diagonal edge 521 is an essential feature of the automotive regulations regarding passing beam spot formation. The location where the diagonal edge 521 meets the horizontal edge 519 is termed the elbow 523, this is also the bottom end of the diagonal edge 521. The top end of the diagonal edge 521 is termed the shoulder 524 and marks the point at which the diagonal edge returns to the horizontal. The horizontal edge 519 is termed the cut-off. The diagonal edge 521 is identified as an edge which is inclined to the other edges within the array. The diagonal edge 521 is shown as being straight, this being preferable for automotive applications. However, it is also possible that the diagonal edge 521 may take the form of a curve, as demonstrated by way of example in curved diagonal edge 535. The diagonal edge 521 is most preferred to have an angle between 30° and 60° from the horizontal, but may fall within the range of 1° to 89° from the horizontal.

Figure 5D:
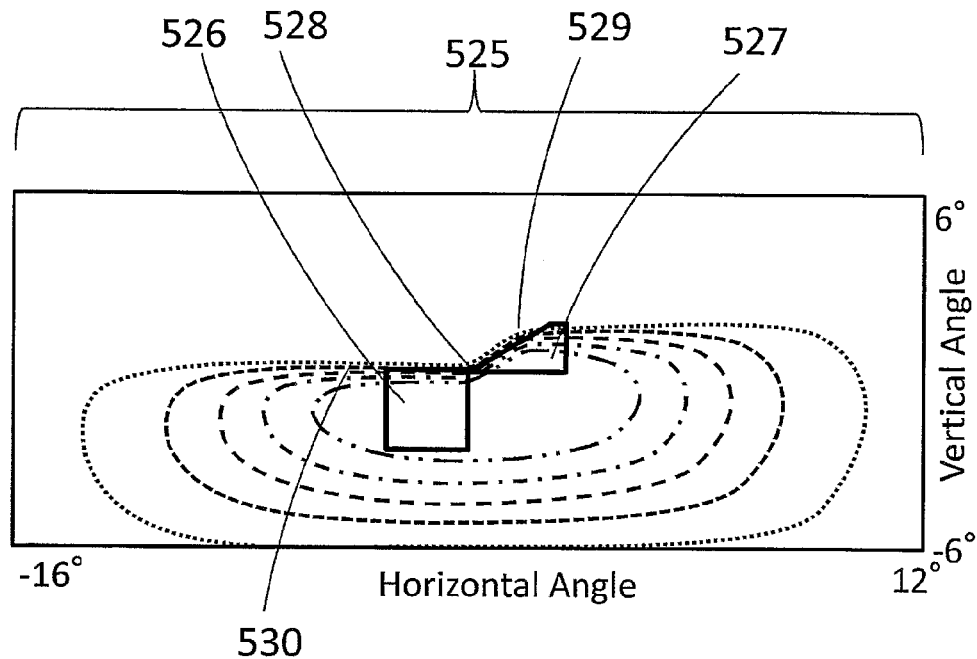
FIG. 5d: far-field beam spot distribution corresponding to a passing beam for right hand drive vehicles.

FIG. 5d shows a far-field beam spot distribution 525 which is formed in the far field by such a configuration of illumination regions shaped as outlined in FIG. 5c. The far-field beam spot distribution 525 is shown to extend between ±6° vertically and from +12° to −16° horizontally. A positive horizontal angle indicates a direction to the near side of the vehicle, that being the side nearest to the right hand side of the road on right hand side drive roads. A negative horizontal angle indicates a direction to the offside of the vehicle, that being the side furthest from the right hand edge of the road on right hand drive roads. The angular dimensions marked are consisted with UNECE regulations regarding the passing beam spot distribution. For comparison between the light source 55 emission distribution and the far-field beam spot distribution 525, the locations of the rectilinear shape 515 and the trapezoidal shape 516 are approximately indicated by the rectilinear outline 526 and the trapezoidal outline 527. The beam spot elbow 528, beam spots shoulder 529 and beam spot cut-off 530 are also marked.

Figure 5E:
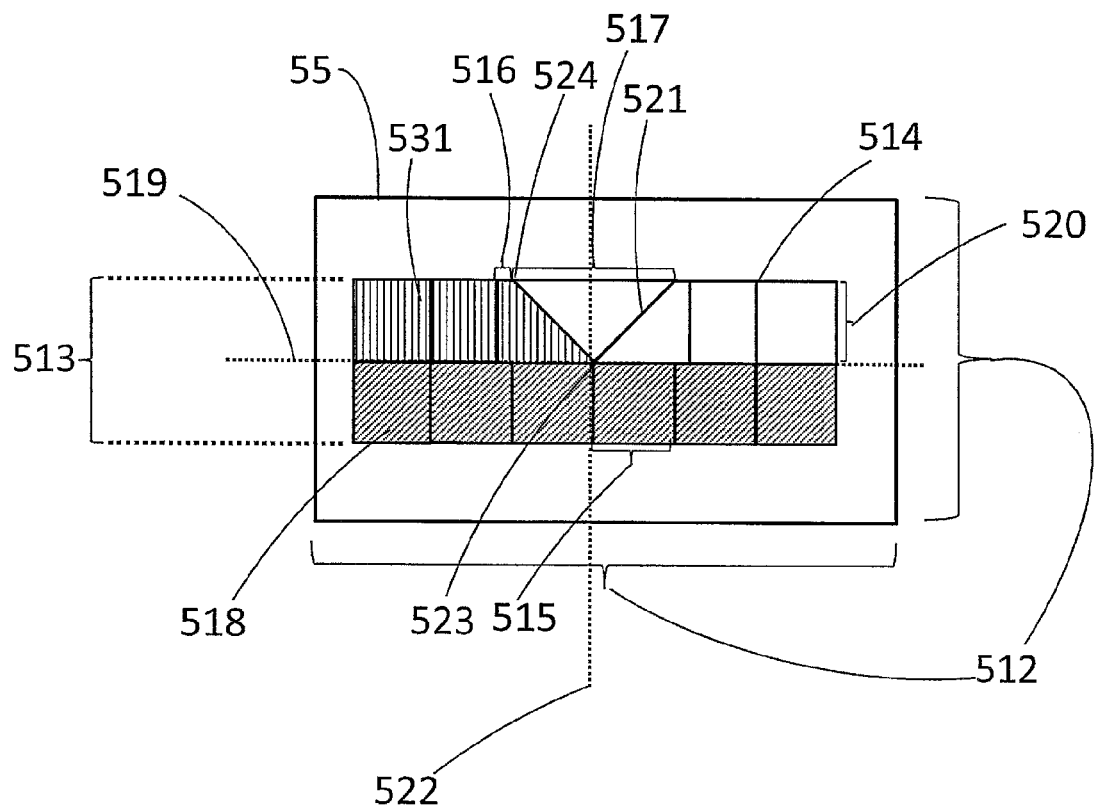
FIG. 5e: plan view of the light source with detail of illumination required for a passing beam distribution for left hand drive vehicles.

FIG. 5e shows how it is possible to generate a passing beam for the opposite hand drive to that shown in FIG. 5c, i.e. left hand drive. This passing beam is obtained by operating the light source system of FIG. 5a in a second mode, in which a second set of the laser emitters 52 are turned on so that the illumination regions highlighted by the diagonal patterned fill 518 and vertical patterned fill 531 in FIG. 5e are illuminated by their associated light beams while other illumination regions are not illuminated. This results in the illumination regions 58 in the raised section 520 above the horizontal edge 519, to the right hand side of the vertical marker 522, being turned off and in the illumination regions 58 on the left hand side of the vertical marker 522, now marked by a vertical patterned fill 531 being turned on. The elbow 523 is shown to be in the same position, however the shoulder 524 has now moved to the left hand side of the vertical marker 522.

In FIG. 5e, the illumination regions that are illuminated as highlighted by the diagonal patterned fill 518 and vertical patterned fill 531 in FIG. 5e include a one illumination region (a "second illumination region") 537 (see FIG. 5b) having one side that is inclined with respect to another side of the region. The inclined side of the second illumination region 537 forms a diagonal edge in the overall illuminated area, and is crossed with the inclined side of the first illumination region 536 that is illuminated in the first mode.

Figure 5F:
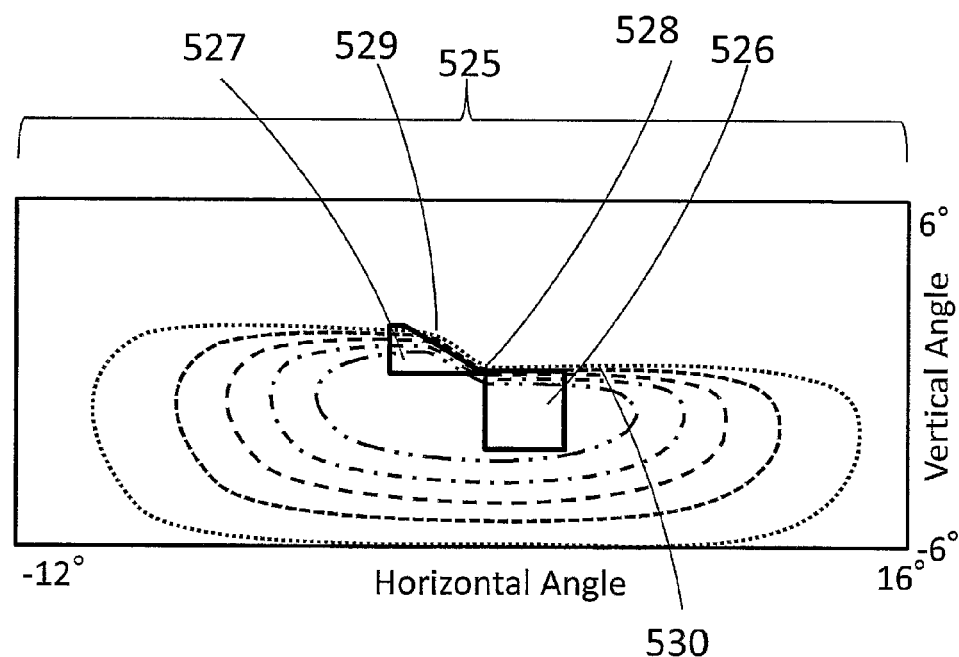
FIG. 5f: far-field beam spot distribution corresponding to a passing beam for left hand drive vehicles.

FIG. 5f shows the far-field beam spot distribution 525 corresponding to the emission distribution as described in FIG. 5e. The positions of the beam spot elbow 528, beam spot shoulder 529 and beam spot cut-off 530 are shown. The approximate position of the section of the beam spot distribution corresponding to a rectilinear shaped 515 illumination region and a trapezoidal shaped 516 illumination region on the light source 55 are shown as the rectilinear outline 526 and the trapezoidal outline 527. The angular ranges are similar to that shown in FIG. 5d, however the horizontal angular range is flipped about a vertical axis.

Figure 5G:
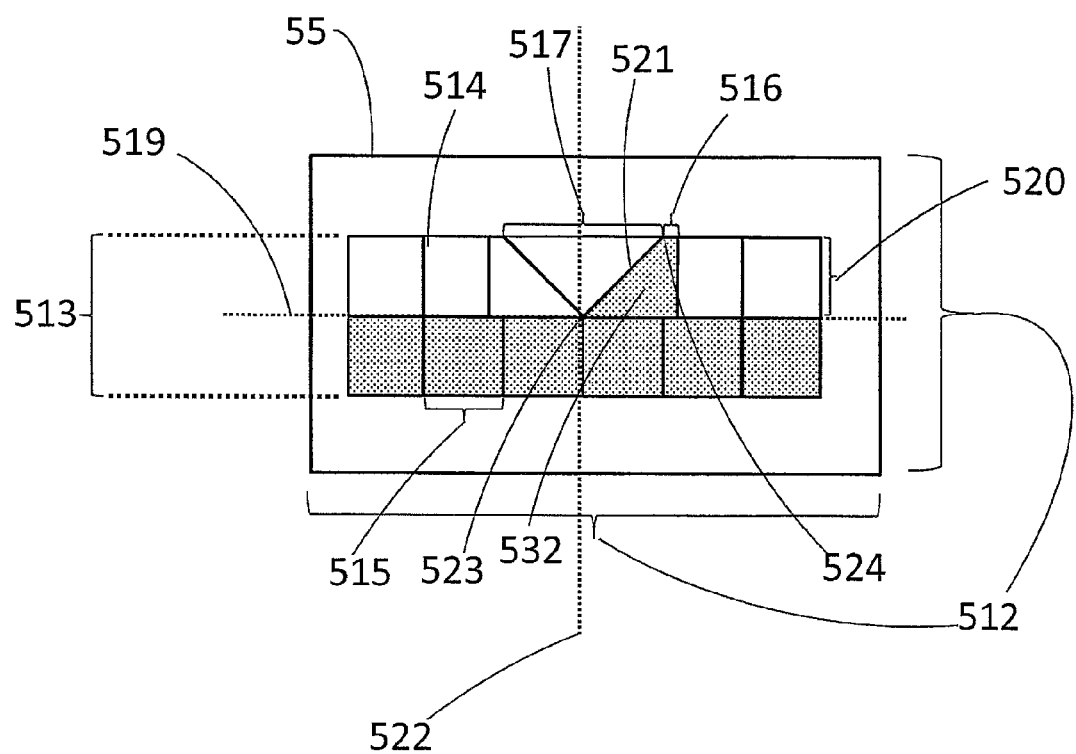
FIG. 5g: plan view of the light source with detail of illumination required for an alternative passing beam distribution for right hand drive vehicles.
Figure 5H:
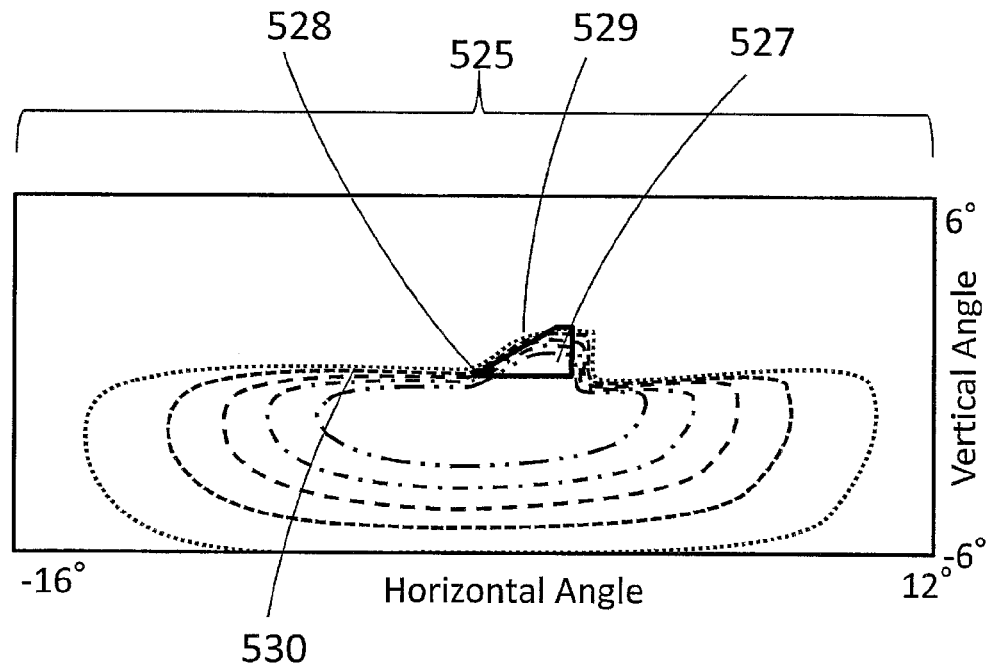
FIG. 5h: far-field beam spot distribution corresponding to an alternative passing beam for right hand drive vehicles.

FIG. 5g shows a further mode of operation of the light source 55, whereby adaptive control may be introduced into the far-field beam spot distribution to produce an alternative passing beam spot distribution. By the application of multiple illumination regions 58 to create the upper half of the far-field beam spot, variations upon the driving beam spot may be achieved by varying the illumination intensity of the individual illumination regions 58. For example, FIG. 5g shows an illumination pattern on the light source 55 whereby the only illumination region above the horizontal edge 519 which is illuminated is the illumination region with the trapezoidal shape 516 to the right of the vertical marker 522. The particular trapezoidal shape is denoted by the dotted pattern fill 532. FIG. 5h shows the far-field beam spot distribution 525 produced by such an illumination pattern on the light source 55. Again the portion of the beam associated with the trapezoidal shaped 516 illumination region 58 is marked by the trapezoidal outline 527. This far-field beam spot distribution 525 is shown by way of example and should not be considered the full extent of the adaptive control of the far-field beam spot.

Figure 5I:
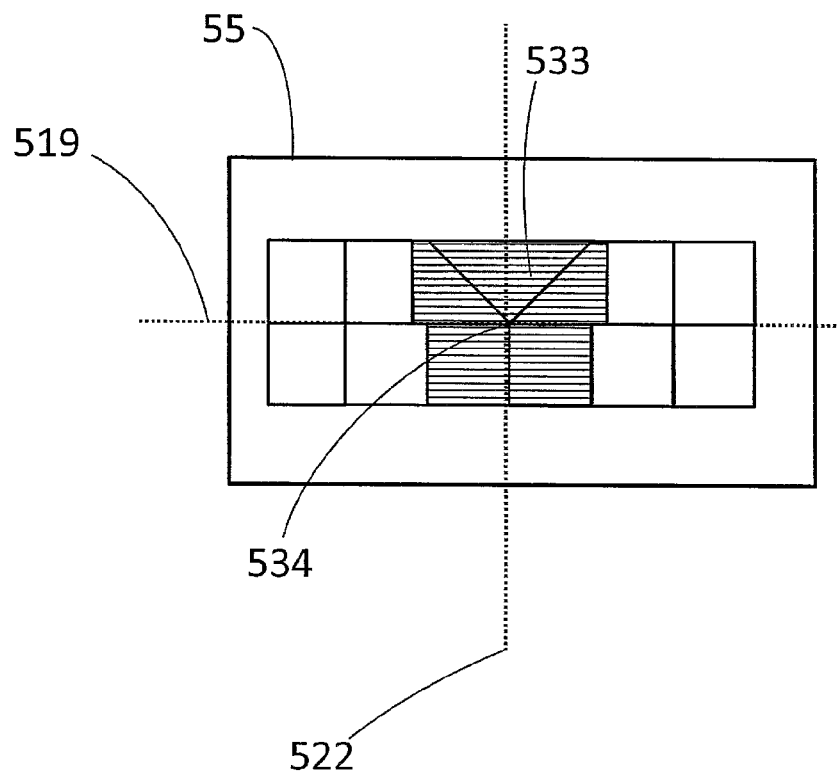
FIG. 5i: plan view of the light source with detail of illumination required to achieve the main features of a driving beam.

In a further (third) mode, the light source system of FIG. 5a may be operated to provide a further (third) far-field illumination pattern that is different to the far-field illumination patterns obtained in the first two modes of operation. For example, if the invention is applied to a vehicle headlight, in the third mode the light source system of FIG. 5a may be operated to provide a further (third) far-field illumination pattern that forms a driving beam. FIG. 5i indicates the group of illumination regions which would be principally controlled to ensure switching from a passing beam to a driving beam as outlined by the UNECE, or other, automotive regulations regarding headlight beam spot patterns. The control referred to is change in brightness of emission by control of output from the laser emitters. To generate a driving beam, the centre of the beam spot must be boosted in brightness. The centre of the light source 55 is responsible for generating the centre of the far-field beam spot and is denoted by the meeting point 534 of the horizontal edge 519 and the vertical marker 522. In a first instance, the illumination regions which need to be illuminated to achieve a far-field pattern suitable for a driving beam are the ones marked by the horizontal pattern fill 533.

Figure 6A:
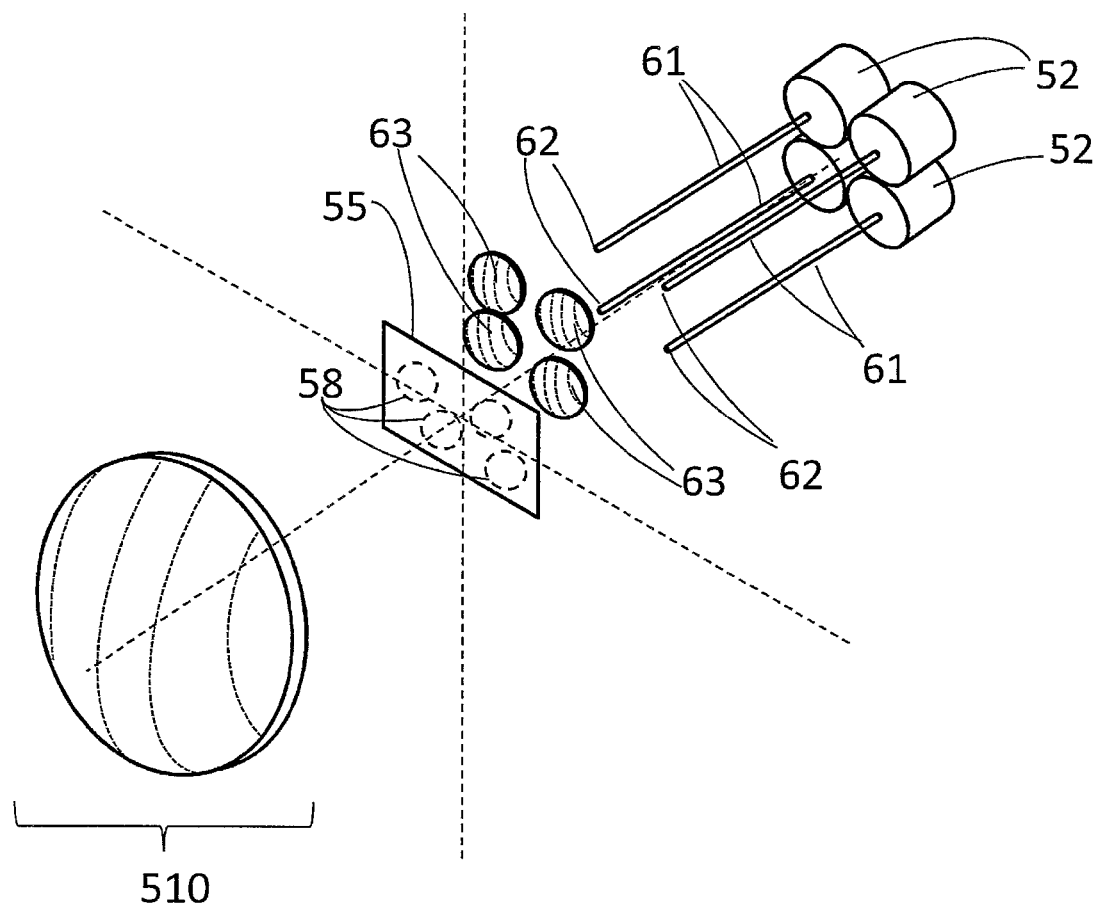
FIG. 6a: preferred method by which the illumination regions are generated upon the light source.

FIG. 6a shows the preferred method by which the array of illumination regions 58 is generated upon the light source 55. The laser emitters 52 emit light which is coupled into optical fibres 61. The output face 62 of the optical fibres 61 is imaged onto the light source 55 by an array of imaging lenses 63. There is one imaging lens 63 associated with each optical fibre 61 output face 62. The images of the output faces 62 of the optical fibres 61 are also magnified onto the light source 55 by the imaging lenses 63. The images of output face 62 of the optical fibres 61 constitute the illumination regions 58 upon the light source 55. The illumination regions 58 would be arranged as illustrated in FIG. 5b, such that an array of abutting shapes is formed without gaps at the boundaries of the shapes. This arrangement of the illumination regions 58 is not shown in FIG. 6a for clarity. As before an optical system 510 is arranged to image the distribution upon the light source 55 into the far-field beam spot. To form the required illumination region shapes, each optical fibre 61 must have a core with the same shape as the illumination region 58 it creates. Example shaped cores of the optical fibres are shown in FIG. 6b. Each optical fibre 61 is shown to have a sleeve 64, a cladding 65 and a core 66. The optical fibres 61 are shown to have a rectilinear shaped core 67 and trapezoidal shaped core 68. These are shown by way of example and the shapes of possible cores should not be limited to such. Other shapes may include square, rectangular, parallelogram, pentagonal, hexagonal etc, indeed any shape which may be effectively tiled into an array. The only exception is for the fibre which may be applied to create an additional illumination region associated with the driving beam distribution and this will be described in a further embodiment.

Other methods for generating the desired array configuration may be applied to this present invention. One such method is the application of a free form optic which is designed to generate a particular brightness distribution at a given plane in space. An example of such a free form optic is a top hat lens. The application of these is described in full detail in the co-pending applications GB 1213297.3 entitled Headlight System Incorporating Adaptive Beam Function and GB 1213299.9 entitled Headlight System Incorporating Adaptive Beam Function.

By the method outlined above a light source system may be created which allows for a headlight with dipped to driving beam switching without the need for mechanical components. The light source distribution is advantageous in allowing the formation of the far-field beam spot on the road as required by automotive regulations governing headlight beam spots without the need for further components in the form of a shield, which would otherwise prevent light from exiting the headlight unit, thereby reducing efficiency. The application of a light source comprised by an array of abutting illumination regions upon a light source made from photoluminescent material also gives further advantage in the potential for adaptive function to be added to the headlight unit without the need for further mechanical components.

Figure 7:
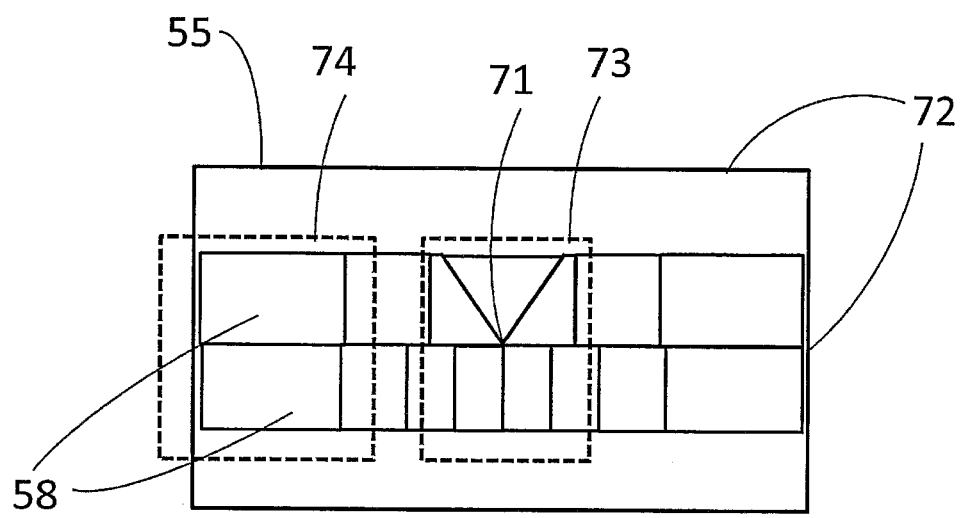
FIG. 7: further embodiment of the present invention; plan view of the light source showing a change in illumination region size as a function of position from the light source centre.

FIG. 7 shows a further embodiment of the present invention whereby the area of the illumination regions 58 changes as a function of position on the light source 55. This is advantageous if the laser emitters have a maximum power at which they may be run and the distribution within the far-field beam spot is not required to be uniform over the entire beam spot. For example, a typical headlight beam would be expected to be significantly brighter in the centre of the beam as it may be projected further in front of the vehicle compared to a portion of the beam which illuminates the sides of the road close to the vehicle. This will enable simultaneous sufficient illumination of the road and the verges at all times. For this to be achieved, the centre 71 of the light source 55 must be able to produce more light per unit area, or luminance, than the edge 72 of the light source 55. If the light source 55 is illuminated by laser emitters with a finite maximum output power it may be preferred to allow all of the laser emitters to operate at the same power levels where possible. Therefore, to allow for a mode of operation whereby all of the laser emitters have the same output power and the light source 55 has a varying output luminance as a function of position, it is necessary to change the area of each of the illumination regions 58 as a function of position away from the centre 71 of the light source 55. This is shown by the centre illumination regions 73 having a smaller area than the edge illumination regions 74. The particular size, shape and number of illumination regions 58 shown in FIG. 7 should not be considered to be the only possible configuration. Indeed, the attributes of the illumination regions 58 may be altered depending on the number of laser emitters applied to illuminate the light source 55, or the size of the light source 55 to be used. The number and size variation of illumination regions may also be applied to subsequent embodiments of the present invention.

Figure 8:
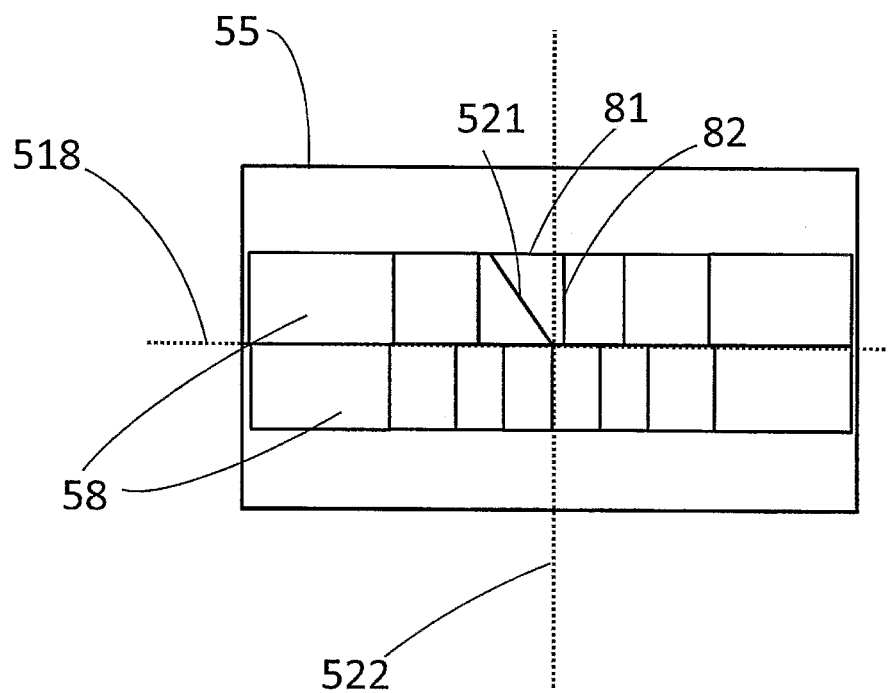
FIG. 8: further embodiment of the present invention; plan view of the light source showing a distribution of illumination regions which is specifically designed for left hand drive vehicles only.

FIG. 8 shows a further embodiment of the present invention whereby the configuration of the illumination regions 58 upon the light source 55 is intended to provide the beam spot for a left hand drive vehicle only. By this arrangement, the at least one diagonal edge 521 is only located on the left hand side of the vertical marker 522. This arrangement is preferred if the vehicle is driven within a country which has left hand drive roads only and there is little or no chance that the vehicle would be driven on the opposite side of the road. The opposing illumination region 81 which matches the diagonal edge 521 to the opposite side of the light source 55 is configured to have a sloped edge with the same angle as the diagonal edge 521 and a sloped edge which meets the diagonal edge 521 without leaving a gap between the two. The far edge 82 of the opposing illumination region may be coincident with the vertical marker 522 if desired, but equally should not be limited to such a location. It is understood that the light source may also be configured for a vehicle driven solely on the right hand side of the road. In this case it need only be mirrored about the vertical marker 522. For this reason it is not shown in a separate figure. This embodiment may also be applied to any preceding or subsequent embodiments.

Figure 9:
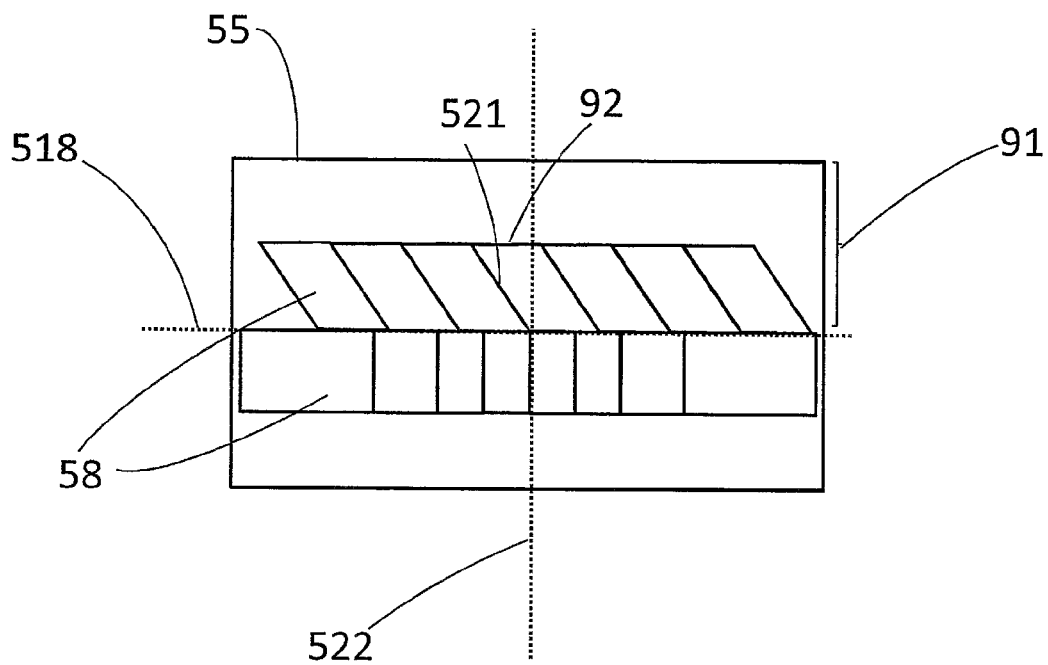
FIG. 9: further embodiment of the present invention; plan view of the light source showing a distribution of illumination regions for a left hand drive vehicle, whereby the diagonal elements are formed from parallelogram shapes.

FIG. 9 shows a further embodiment of the present invention whereby the top half 91 of the light source 55 is formed from illumination regions in which both sides are diagonal edges 521. By this configuration the illumination regions 58 in the top half 91 of the light source 55 are parallelogram shapes 92, for example are rhomboids. By this it is meant that the two opposite sides of each parallelogram shape 92 are parallel to each other. This arrangement has advantage in that the position of the elbow and shoulder within the far-field beam spot may be moved horizontally within the beam spot by turning on or off different parallelogram shaped 92 illumination regions in the top half 91 of the light source 55. The configuration of the light source 55 shown in FIG. 9 is for a left hand drive vehicle, however, it is understood that the light source 55 can be modified for right hand drive by simply changing the angle of the diagonal edge 521. This embodiment may be applied to any other preceding or subsequent embodiments.

Figure 10:
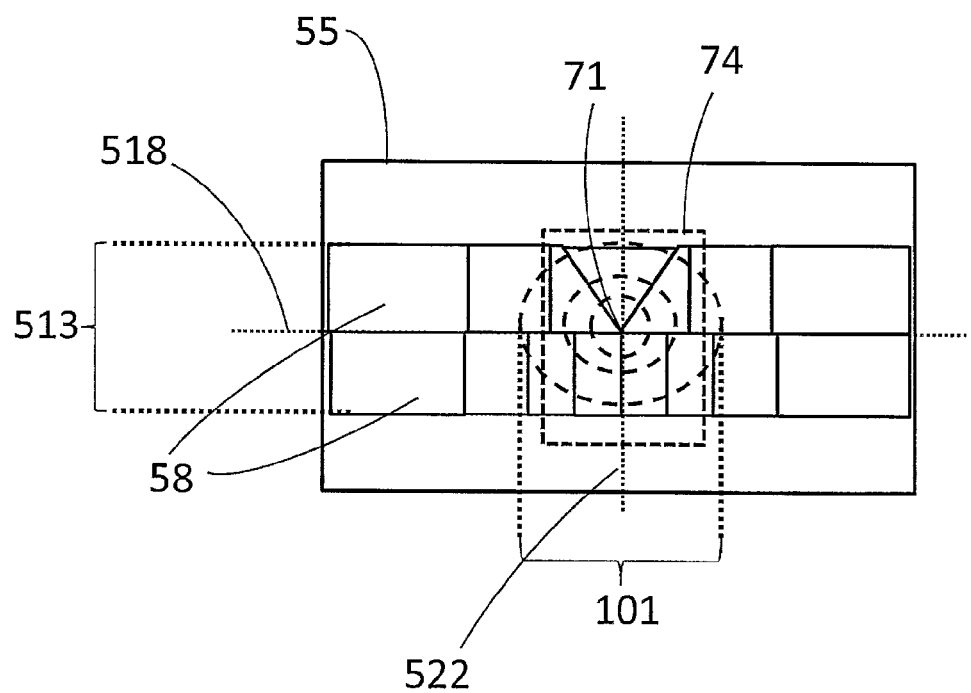
FIG. 10: further embodiment of the present invention; plan view of the light source showing a distribution of illumination regions whereby the driving beam is created by a supplementary overlay of further illumination regions.

FIG. 10 shows a further embodiment of the present invention where by the light source 55 is illuminated by an array 513 of illumination regions 58 which is overlaid by at least one further illumination region 101. The at least one further illumination region 101 is arranged to be coincident with the centre 71 of the light source 55, at the point where the horizontal edge 518 and vertical marker 522 meet. The further illumination regions 101 are provided to achieve a boost in brightness output from the light source 55 at the centre. This may be to facilitate switching from the passing beam to the driving beam. It may also be to prevent the centre illumination regions 74 from becoming too small if the power density to be provided from the laser emitters becomes too great for individual laser emitters to effectively provide. This embodiment may be applied to any other preceding or subsequent embodiments.

Figure 11:
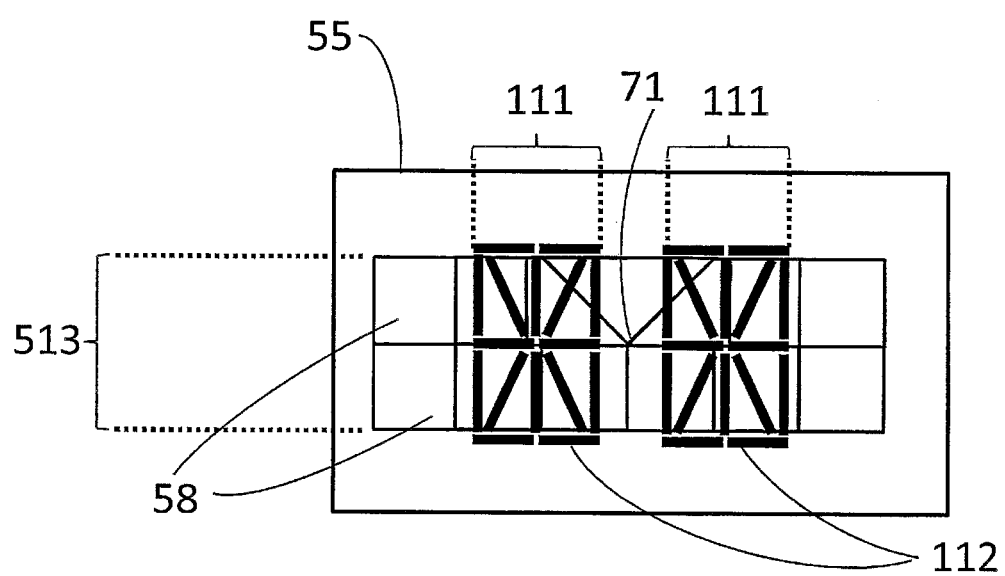
FIG. 11: further embodiment of the present invention; plan view of the light source showing a distribution of illumination regions in alphanumeric form, allowing distribution of text based information in the beam spot.

FIG. 11 shows a further embodiment of the present invention whereby a light source 55 is illuminated by an array 513 of illumination regions 58 which are further overlaid by alphanumeric illumination regions 111. The alphanumeric illumination regions 111 are comprised from multiple illumination sub-spots 112 which, when controlled individually for brightness, can spell out a number of numbers or letters. The application of alphanumeric illumination regions 111 allows the presentation of written information within the far-field beam spot. For the best reproduction of the numerals it is preferred that the alphanumeric illumination regions 111 are located close to the centre 71 of the light source 55. The particular configuration of alphanumeric arrangement shown is well known therefore examples of how to achieve particular letters or numbers is not described herein. In this instance each alphanumeric illumination region 111 is comprised of sixteen illumination sub-spots 112. Although this is the preferred configuration for the alphanumeric illumination regions 111 the design of such should not be limited to just sixteen illumination sub-spots 112. This embodiment may be applied to any other preceding or subsequent embodiments.

Figure 12A:
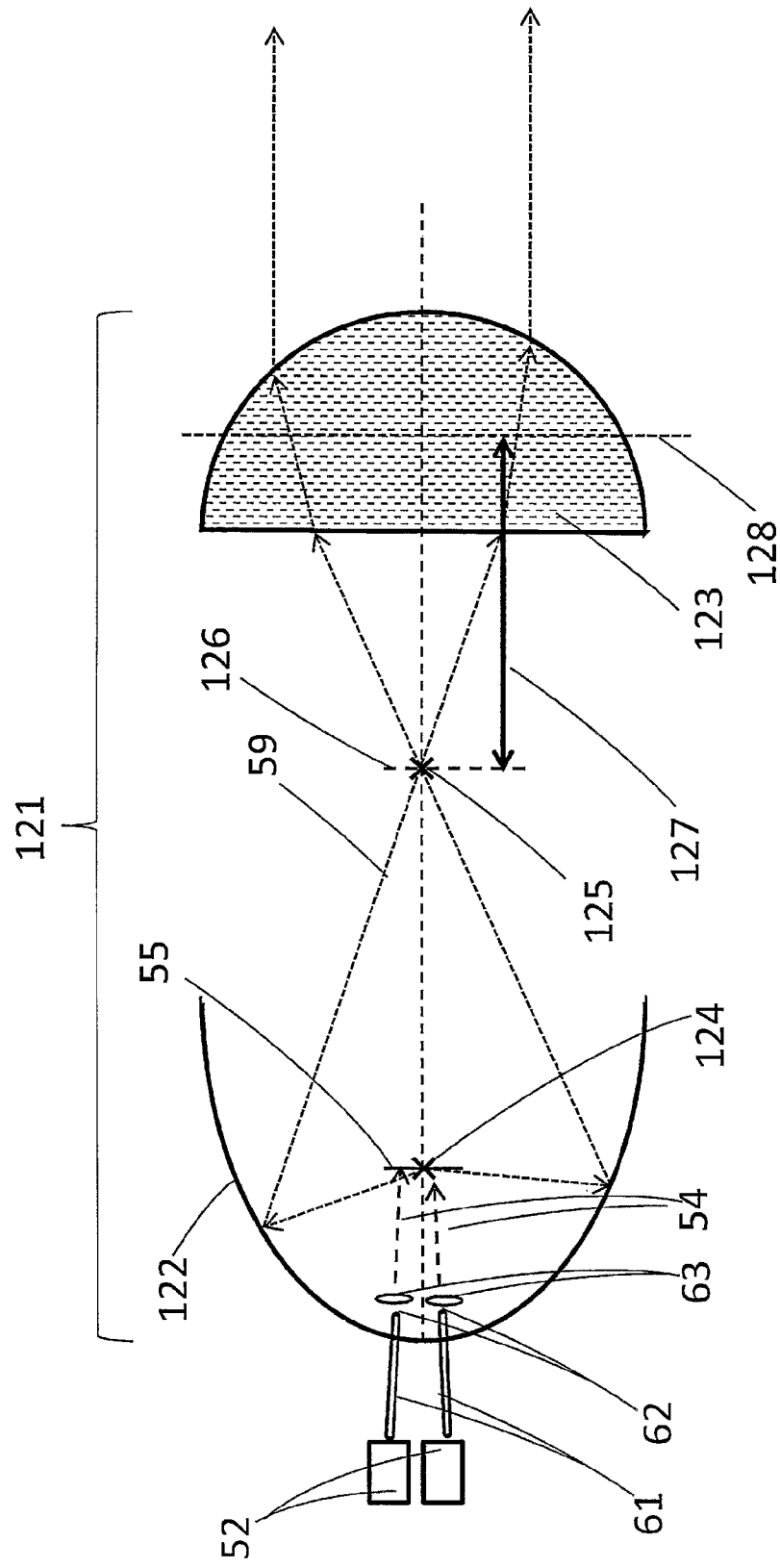
FIG. 12a: further embodiment of the present invention; projection optical system for generation of the beam spot, based upon an ellipsoidal reflector and projection lens.

FIG. 12a shows a further embodiment of the present invention whereby the light source 55 is imaged into the far-field by a projection optical system 121 consisting of an ellipsoidal reflector 122 and projection lens 123. The ellipsoidal reflector 122 consists of a surface which directs secondary light 59 emitted from a first focal point 124 to a second focal point 125. The ellipsoidal reflector 122 is capable of forming an image of an object, located at the first focal point 124, at the second focal point 125. The second focal point 125 coincides with the focal plane 126 of the projection lens 123. The projection lens 123 magnifies the image at the second focal point 125 into the far-field beam spot. The light source 55 is located at the first focal point 124 and therefore an image of the light source 55 is formed directly into the far-field beam spot. The magnification of the light source 55 into the far-field beam spot may be controlled directly by the focal length 127 of the projection lens 123. It is understood that the focal length 127 refers to the distance from the second focal point 125 to the corresponding principal plane 128 within the projection lens 123. By reducing the focal length 127 of the projection lens 123 the magnification factor of the light source 55 image into the far-field beam spot may be increased. Conversely, by increasing the focal length 127 of the projection lens 123 the magnification factor of the light source 55 image in the far-field beam spot may be reduced. This allows the light source 55 size to be changed in a manner best suited to the projection optical system 121 design.

Figure 12B:
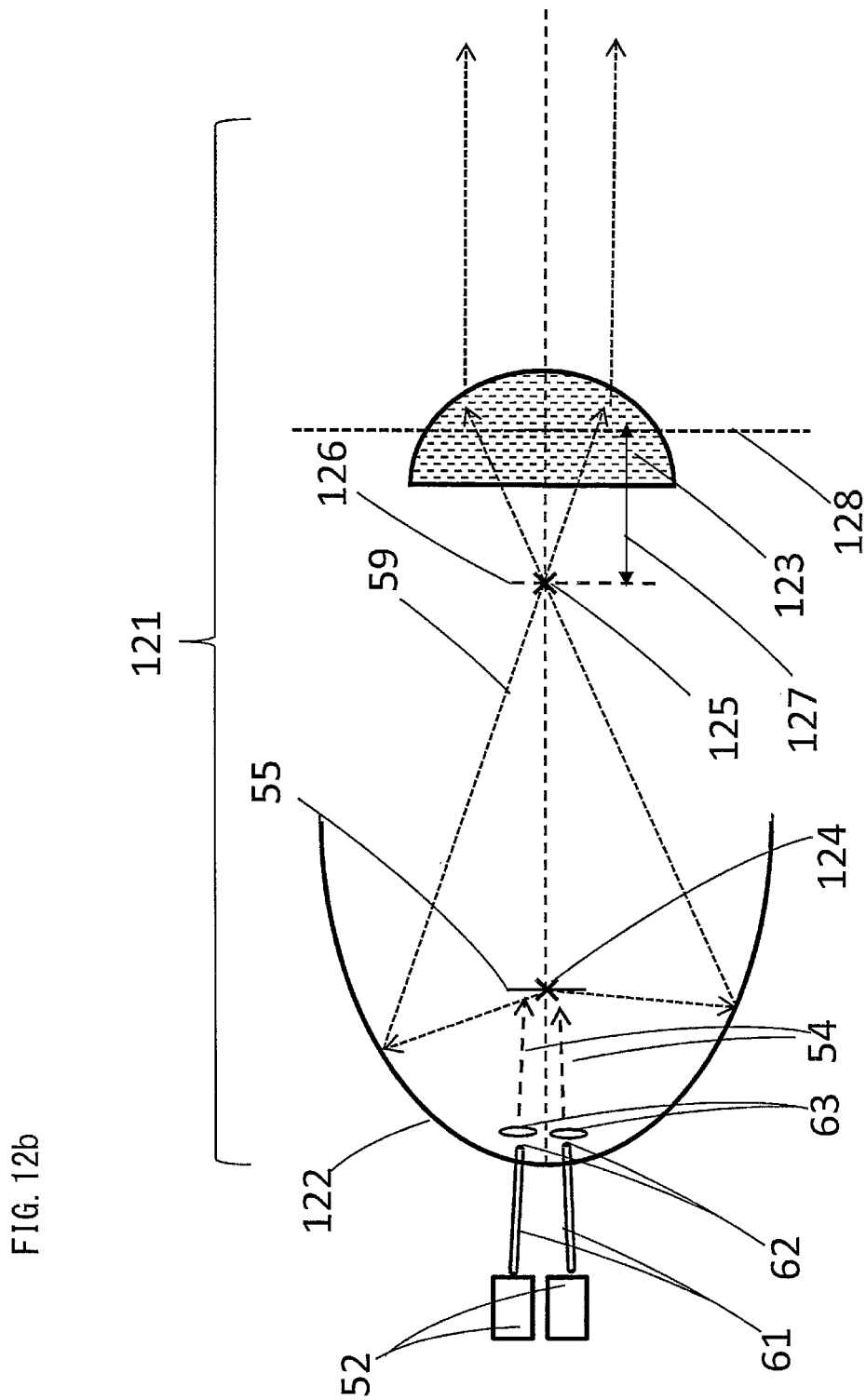
FIG. 12b: further embodiment of the present invention; projection optical system for generation of the beam spot, whereby the projection lens is smaller than the ellipsoidal reflector.
Figure 12C:
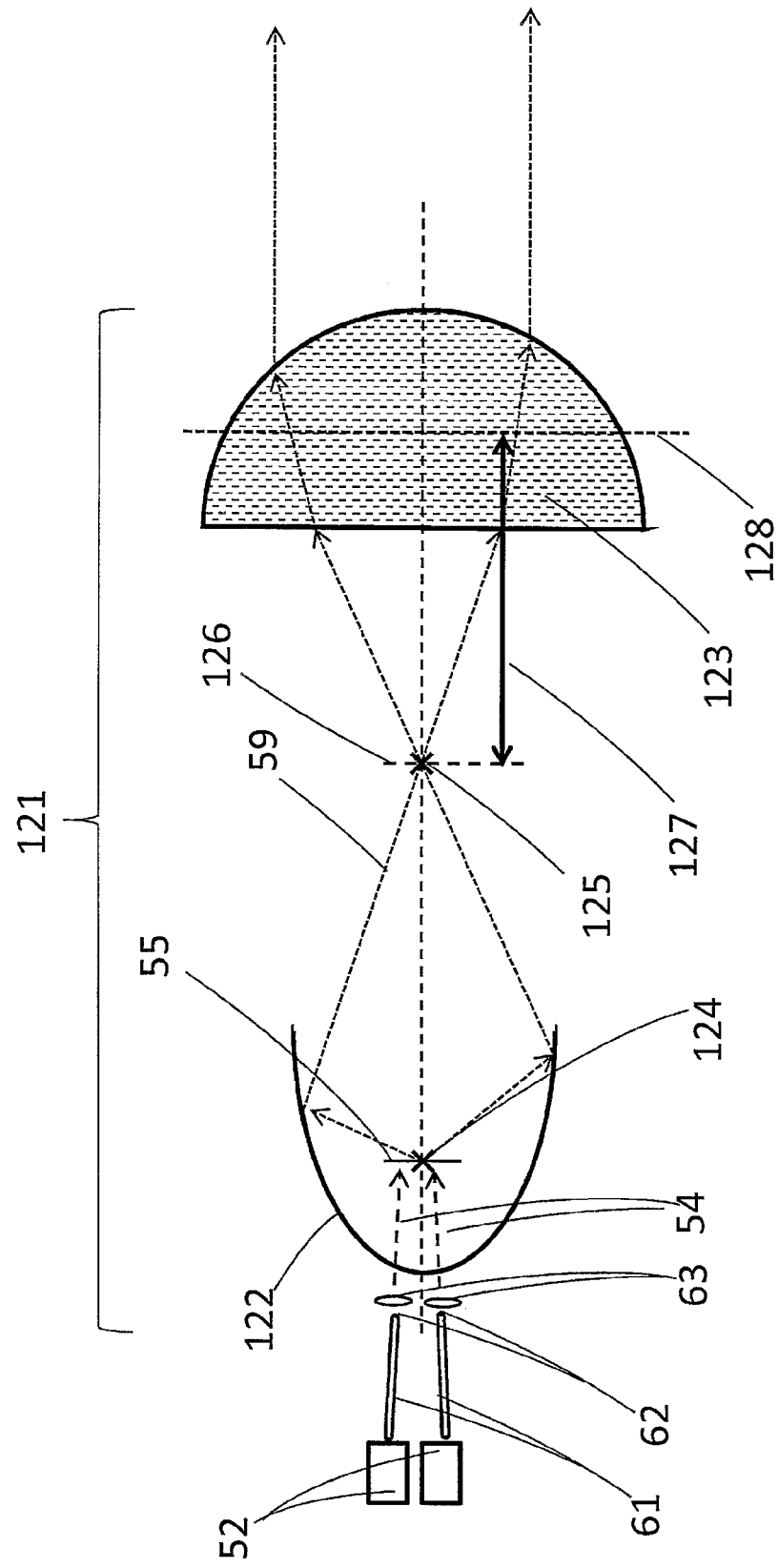
FIG. 12c: further embodiment of the present invention; projection optical system for generation of the beam spot, whereby the ellipsoidal reflector is smaller than the projection lens.

In FIG. 12a, an extent, perpendicular to an optical axis of the light source system, of the ellipsoidal reflector 122 is substantially equal to an extent, perpendicular to an optical axis of the light source system, of the projection lens 123. The invention is not however limited to this. For example, FIG. 12b shows a further configuration of this embodiment where by the extent, perpendicular to an optical axis of the light source system, of the projection lens 123 is smaller than the extent, perpendicular to an optical axis of the light source system, of the ellipsoidal reflector 122. This system has advantage in the reduction of material used in the projection lens 123. In addition, this leads to a reduction of mass of the entire projection optical system 121. The focal length 127 of the projection lens 123, and hence the size of the projection lens 123, governs the magnification factor of the light source 55 into the far-field beam spot. However, the size of the ellipsoidal reflector 122 governs the quality of the image of the light source 55 formed at the second focal point 125. Therefore, it is alternatively possible for the projection optical system 121 to be formed from an ellipsoidal reflector 122 which has an extent, perpendicular to an optical axis of the light source system, that is smaller than the extent, perpendicular to an optical axis of the light source system, of the projection lens 123, as shown in FIG. 12c. This configuration will lead to a yet smaller, and less mass, projection optical system 121, but one with slightly degraded image quality compared to one with a larger reflector. Conversely, a projection optical system 121 with a larger extent ellipsoidal reflector 122 relative to the projection lens 123 will take up more volume, and be more massive, but will have a better quality of image projection of the light source 55. The particular configuration of projection optical system 121 may be chosen dependent on priorities at the design of such a system. In each of FIGS. 12a, 12b and 12c the light source 55 is shown as being illuminated by light beams 54 emitted from laser emitters 52. The light from the laser emitters 52 is transmitted through optical fibres 61 to respective output faces 62, imaging lenses 63 image the brightness distribution of the output faces 62 onto the light source 55.

Figure 13:
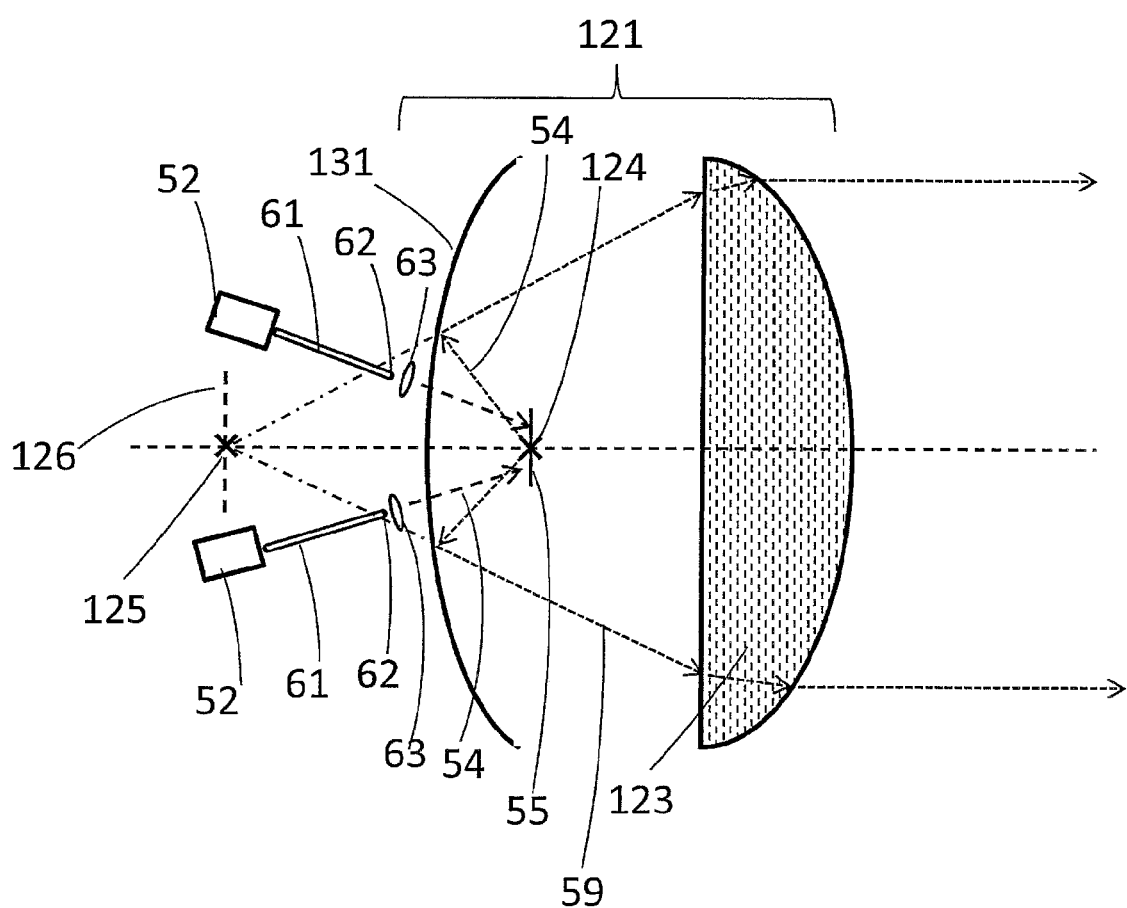
FIG. 13: further embodiment of the present invention; projection optical system for generation of the beam spot, based upon a hyperbolic reflector and a projection lens.

FIG. 13 shows a further embodiment of the present invention whereby the light source 55 is imaged into the far-field by a projection optical system 121 consisting of a hyperbolic reflector 131 and a projection lens 123. The light source 55 is once again located at the first focal point 124 of the hyperbolic reflector 131. The secondary light 59 emitted from the first focal point 124 is reflected from the hyperbolic reflector 131 and re-directed in such a direction that the light appears to have come from the second focal point 125. Therefore, a virtual image of the light source 55 is formed at the second focal point 125. The second focal point 125 is coincident with the focal plane 126 of the projection lens 123, such that the projection lens 123 magnifies the virtual image of the light source 55 into the far-field beam spot. As in previous embodiments, the light source 55 is shown as being illuminated by light beams 54 which are emitted from laser emitters 52. The light from the laser emitters 52 is transmitted by optical fibres 61 to respective output faces 62, the brightness distribution of the output faces 62 are then imaged onto the light source 55 by imaging lenses 63. As in previous embodiments the focal length of the projection lens 123 will determine the magnification of the light source 55 image into the far-field beam spot.

Figure 14:
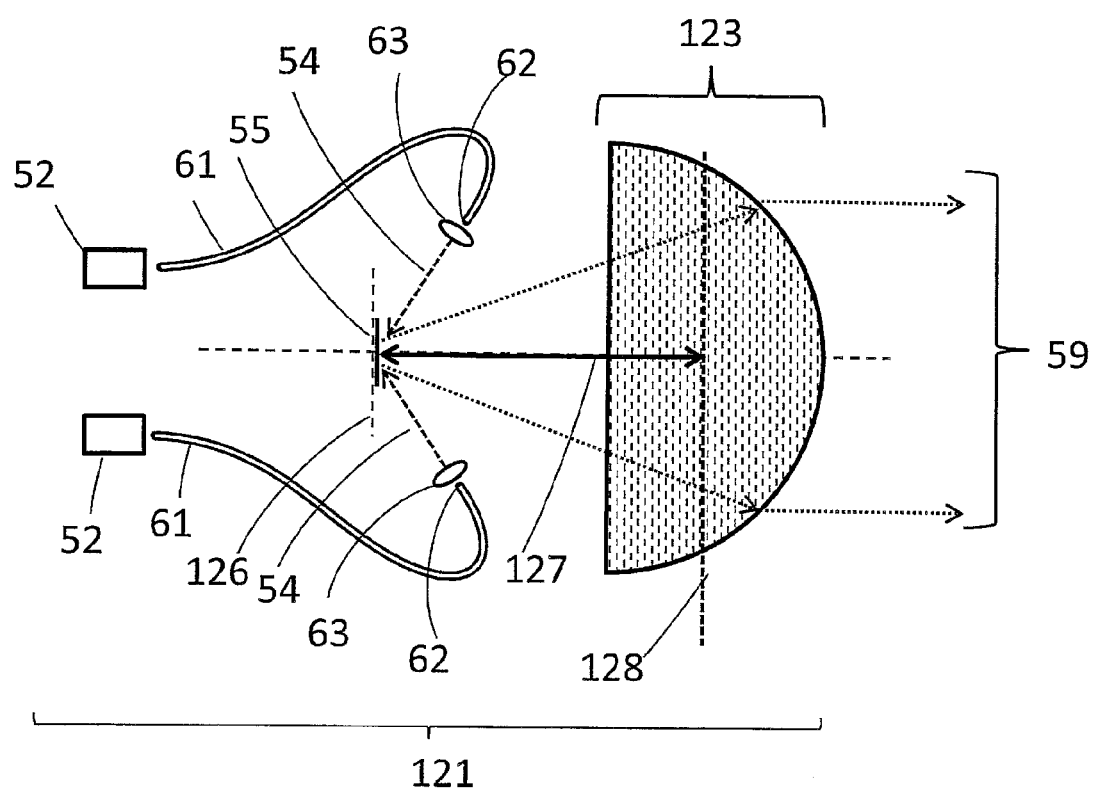
FIG. 14: further embodiment of the present invention; projection optical system for generation of the beam spot, based upon a projection lens.

FIG. 14 shows a further embodiment of the present invention whereby the light source 55 is imaged into the far-field by a projection optical system 121 consisting of a projection lens 123 only. By this arrangement, the projection lens 123 images the light source 55 directly into the far-field beam spot. As in previous embodiments, the light source 55 is shown as being illuminated by light beams 54 which are emitted from laser emitters 52. The light from the laser emitters 52 is transmitted by optical fibres 61 to respective output faces 62, the brightness distributions of the output faces 62 are then imaged onto the light source 55 by imaging lenses 63. As in previous embodiments, the focal length 127 of the projection lens 123 will determine the magnification of the light source 55 image into the far-field beam spot.

Figure 15:
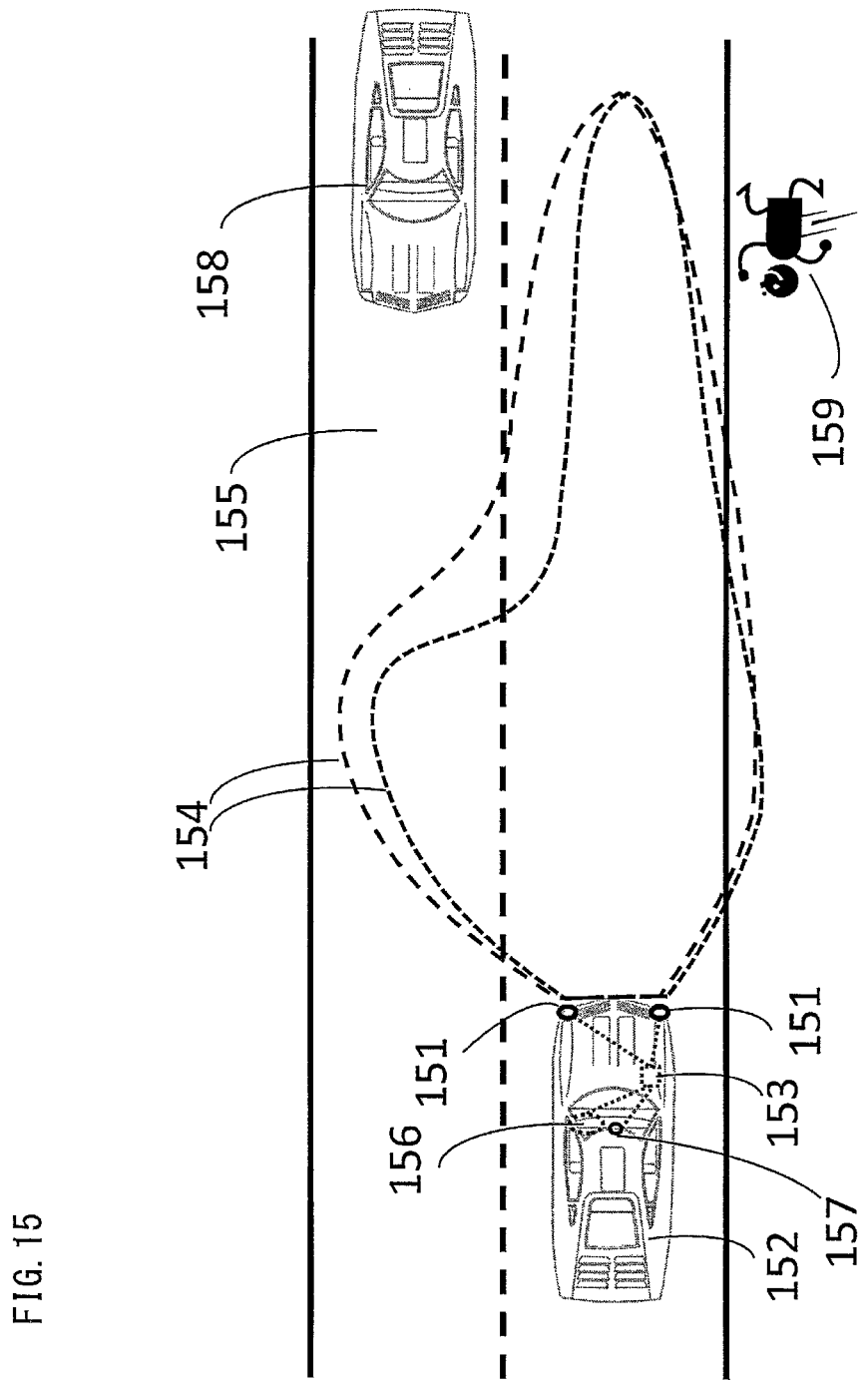
FIG. 15: system overview of the present invention.

FIG. 15 shows a system view of the headlight unit 151 within an automobile 152. The headlight units 151 are controlled by a central control unit 153. The control unit changes the output from the headlight units 151 to alter the beam spot distribution 154 on the road 155 in response to input from either the driver console 156 or a signal from an automatic system which detects the conditions of the road 155, e.g. a camera 157. The beam spot may be modified to account for the presence of oncoming automobiles 158 or other hazards, for example a pedestrian 159 about to enter the road 155.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The present invention can be applied to the automotive industry and more specifically the provision of advanced adaptive front lighting systems to the headlights of automobiles.

SUPPLEMENTAL NOTES

A first aspect of the present invention provides a light source system operable in at least first and second modes to provide at least and first and second different far field illumination patterns, the system comprising: a photoluminescent material; and a light beam generator for generating, in the first mode, a first set of one or more light beams for illuminating respective first regions of the photoluminescent material and for generating, in the second mode, a second set of one or more light beams for illuminating respective second regions of the photoluminescent material, the first and second sets of light beams being independently controllable; wherein in the first mode, the light beam generator generates the first set of light beams such that a first beam of the first set of light beams illuminates a first illumination region of the photoluminescent material having one side that is inclined with respect to another side of the illumination region.

For the avoidance of doubt, the first set of light beams and/or the second set of light beams may consist of only a single light beam.

By "inclined" is meant that the angle between the two sides is not 90° (and is not zero). Preferably, the term "inclined" denotes that the angle between the two sides is within a range which is less than 75° and greater than 15°, more preferably that the angle between the two sides is within a range which is less than 60° and greater than 30°, and even more preferably that the angle is equal to or is close to 45°.

By specifying that the sets of light beams are independently controllable is meant that the intensity of the light beam(s) of one set is controllable independently of the intensity of the light beam(s) of the other set, and optionally that the or any light beam of one set is controllable independently of the intensity of the or any light beam of the other set. (It should be noted that the region of the photoluminescent material that is illuminated by one set of light beams may or may not overlap the region of the photoluminescent material that is illuminated by another set of light beams.)

The photoluminescent material may be a fluorescent material, such as a fluorescent phosphor.

For the avoidance of doubt, the term "phosphor" as used herein includes a nanophosphor.

In the second mode, the light beam generator may generate the second set of light beams such that the light beam or at least one beam of the second set of light beams illuminates a second region of the photoluminescent material having one side that is inclined with respect to another side of the region, the inclined side of the second illumination region being crossed with the inclined side of the first illumination region of the first mode. The first illumination region may be not illuminated in the second mode. This embodiment may, for example, be used in a headlight for a vehicle that can produce, in one mode, a dipped beam suitable for use for driving on the left hand side of the road and that can produce, in another mode, a dipped beam suitable for use for driving on the right hand side of the road.

The inclined sides of the two illumination regions will have finite length. Specifying that the sides are "crossed" with one another does not mean that the sides are required to intersect one another. Rather, by specifying that the inclined side of the second illumination region of the second is "crossed" with the inclined side of the first illumination region of the first mode is meant that a projection of one of the sides intersects a projection of the other side.

The second illumination region of the second mode may be substantially a mirror image of the first illumination region of the first mode.

The first far field illumination pattern and the second far field illumination pattern may be substantially mirror images of one another.

The system may be operable in a third mode to provide a third far field illumination patterns different from the first and second far field illumination patterns. For example when the invention is applied in a headlight for a vehicle the third mode may produce a far field illumination pattern that provides a driving beam. (For the avoidance of doubt, a light system of this embodiment of the invention is not necessarily limited to operation in just the first, second and third modes and in principle may also be operable in further modes in addition to the first, second and third modes.)

In the third mode, the light beam generator may generates a third set of light beams for illuminating respective regions of the photoluminescent material, the third set of light beams illuminating the first illumination region and the second illumination region.

Alternatively, the first far field illumination pattern may be substantially a translation of the second far field illumination pattern. For example when the invention is applied in a headlight for a vehicle, this embodiment allows the position of the elbow and shoulder of the dipped beam pattern to be moved laterally within the beam spot.

In the first mode, the light beam generator may generate the first set of one or more light beams such that the first illumination region on the photoluminescent material has first and third sides that are inclined with respect to a second side of the region. (The term "inclined" is to be understood as having the same meaning as given above.)

In the second mode, the light beam generator may generate the second set of one or more light beams such that the first illumination region is not illuminated by the second set of light beams.

The light beam generator may be adapted to generate light beams that illuminate respective regions of the photoluminescent material having first and third sides that are inclined with respect to a second side, a first group of said light beams being included in the first set of light beams generated in the first mode and a second, different group of said light beams being included in the second set of light beams generated in the second mode. (The term "inclined" is to be understood as having the same meaning as that given above.)

The first and third sides of said regions having first and third sides that are inclined with respect to a second side may be generally parallel to one another.

Said regions having first and third sides that are inclined with respect to a second side may further have a fourth side that is generally parallel to the second side.

The regions having first and third sides that are inclined with respect to a second side may be adjacent to one another.

The regions having first and third sides that are inclined with respect to a second side may be arranged such that the second sides of the regions are substantially co-linear with one another.

The system may further comprise an optical system arranged to image light emitted from the photoluminescent material into the far field. The optical system may for example include a reflector and a projection lens, with the reflector being arranged to reflect light emitted by the photoluminescent material towards the projection lens.

An extent, perpendicular to an optical axis of the light source system, of the reflector may be substantially equal to an extent, perpendicular to an optical axis of the light source system, of the projection lens. The term "extent" may refer to a linear dimension (for example radius if the reflector and the projection lens are substantially circular in shape) or to an area.

Alternatively, an extent, perpendicular to an optical axis of the light source system, of the reflector may be less than an extent, perpendicular to an optical axis of the light source system, of the projection lens.

Alternatively, an extent, perpendicular to an optical axis of the light source system, of the reflector may be greater than an extent, perpendicular to an optical axis of the light source system, of the projection lens.

The areas and/or shapes of regions of the photoluminescent material illuminated by respective light beams vary over the area of the photoluminescent material. For example the areas of illuminated regions near the centre of the photoluminescent material may be smaller than the areas of illuminated regions away from the centre of the photoluminescent material, to provide a higher level of illumination per unit area at the centre of the photoluminescent material.

The light beam generator may be adapted to generate an additional set of one or more light beams for illuminating respective additional regions of the photoluminescent material co-located with one or more first regions of the photoluminescent material (when the light source system is operating in the first mode) or co-located with one or more second regions of the photoluminescent material (when the light source system is operating in the second mode). The additional set of light beams allows information to be provided within the far field pattern.

The additional regions of the photoluminescent material may define one or more alpha-numeric characters.

A second aspect of the invention provides a headlight for a motor vehicle comprising a light source system of the first aspect.

A third aspect of the invention provides a vehicle comprising a headlight of the second aspect.

The feature that an extent, perpendicular to an optical axis of the light source system, of the reflector is less than or is greater than an extent, perpendicular to an optical axis of the light source system, of the projection lens is not limited to use with a light source system in which one of the light beams illuminates an illumination region of the photoluminescent material having one side that is inclined with respect to another side of the illumination region, but may also be applied to other light sources. Accordingly, a further aspect of the invention provides a light source system operable in at least first and second modes to provide at least and first and second different far field illumination patterns, the system comprising: a photoluminescent material; and a light beam generator for generating at least two independently controllable sets of one or more light beams for illuminating respective regions of the photoluminescent material; wherein the light beam generator comprises at least one semiconductor light emitting device spatially separated from the photoluminescent material; and wherein an extent, perpendicular to an optical axis of the light source system, of the reflector is less than or is greater than an extent, perpendicular to an optical axis of the light source system, of the projection lens. A light source system of this aspect may again be used in a headlight for a motor vehicle.

An aspect of the invention provides a light source system operable in at least first and second modes to provide at least and first and second different far field illumination patterns, the system comprising: a photoluminescent material; and a light beam generator for generating at least two independently controllable sets of light beams for illuminating respective regions of the photoluminescent material; wherein the light beam generator comprises at least one semiconductor light emitting device spatially separated from the photoluminescent material; the distribution upon the light source is particularly arranged to provide at least the passing beam and driving beam of an automotive headlight; wherein the distribution is provided by an array of abutting illumination regions shaped to provide the correct shape of far-field illumination patterns without gaps between the illumination regions; the distribution formed by the illumination regions is independent of the shape of the photoluminescent material comprising the light source; and at least one of the abutting illumination regions shapes has a diagonal edge. By causing the generating means to generate one set of light beams so as to illuminate one region of the photoluminescent material, the one region of the photoluminescent material is caused to emit visible light and thus generate one far field illumination pattern, whereas causing the generating means to generate another set of light beams so as to illuminate another region of the photoluminescent material, the another region of the photoluminescent material is caused to emit visible light and thus generate another far field illumination pattern.

The prior art outlined above addresses the provision of a far-field illumination patterns from a headlight unit by the use of varying distributions upon a light source, or by the application of a particularly shaped light source, or by the application of multiple light sources. However, they do not allow for a headlight unit with dipped and driving beam distributions provided from an abutting array of illumination regions upon a single light source, the illumination regions generated by multiple semiconductor light emitting devices located at a position remote from the photoluminescent material and the shape of the light source being independent of the shape of the array of illumination regions upon it. This invention aims to address that deficiency. Furthermore, the current invention can provide for a projector-type headlight which can create a dipped beam profile for either left hand or right hand drive vehicles without the use of a shield to remove light from the projected beam, thereby increasing optical efficiency of the headlight whilst still allowing enhanced function of the headlight.

Furthermore in the lamp module of U.S. Pat. No. 7,654,712 each light emission part is located adjacent to the associated fluorescent substance. In operation the light emission part and the fluorescent substance will both generate heat, and because the light emission part is located adjacent to the associated fluorescent substance it will be difficult to remove this waste heat efficiently. In the present invention, however, the semiconductor light emitting device(s) are spatially separated from the photoluminescent material, so that the waste heat generated by the semiconductor light emitting device can be dealt with separately from the waste heat generated by the photoluminescent material.

A light source which is formed from a shape of photoluminescent material which is independent of the distribution array shape of illumination regions upon it.

An array of illumination regions which are shaped to provide at least the passing beam and driving beam required by automotive regulation governing beam spot distributions upon the road.

An array of illumination regions which are shaped to form an array without gaps.

Illumination regions which comprise shapes which can be arranged to form such an array.

An array of illumination regions of which at least one contains a diagonal edge.

An array of illumination regions in which the diagonal corresponds to the passing beam spot region between the elbow and shoulder as outlined by automotive regulations.

Illumination regions which are rectilinear in shape.

Illumination regions which are triangular in shape.

Illumination regions which are trapezoidal in shape.

Illumination regions which are parallelograms.

An array of illumination regions provided such that a passing beam for left hand drive is generated.

An array of illumination regions provided such that a passing beam for right hand drive is generated.

An array of illumination regions provided such that a passing beam for either right or left hand drive is generated.

An array of illumination regions provided such that alternative shapes of passing beam may be generated.

An array of illumination regions provided such that adaptive control of the beam spot may be achieved.

An array of illumination regions whereby the driving beam is provided by increase in brightness of some of the illumination regions comprising the array.

An array of illumination regions whereby the driving beam is provided by additional illumination regions which are overlaid upon the original array.

Additional illumination regions which have an oval shape.

An array of illumination regions whereby the area of the illumination regions changes as a function of position with respect to the centre of the light source.

An array of illumination regions whereby multiple illumination regions have diagonal edges for the possible movement of the passing beam elbow and shoulder features.

An array of illumination regions which are overlaid by further arrays of illumination regions which form alphanumeric shapes for the provision of text based information in the beam spot.

The light beam generator comprising a plurality of independently controllable semiconductor light emitting devices, spatially separated from the photoluminescent material, emitting light which is coupled into multiple optical fibres, the output of which is imaged onto the light source to generate the array of abutting illumination regions.

A light beam generator in which the semiconductor light sources are laser emitters.

A light beam generator in which the semiconductor light source are light emitting diodes (LEDs).

The light beam generator in which the optical fibres have cores which are shaped according to the shape of the illumination region which they form.

The light beam generator in which the optical fibres have cores formed from shapes that may be abutted.

Optical fibres which have cores with a triangular shape.

Optical fibres which have cores with a rectilinear shape.

Optical fibres which have cores with a trapezoidal shape.

Optical fibres which have cores with parallelogram shapes.

Optical fibres which have cores with hexagonal shapes.

Optical fibres which have cores with pentagonal shapes.

Optical fibres which have cores with an oval shape.

A light beam generator in which further methods for forming the abutting array of illumination regions upon the light source is disclosed in co-pending UK patent applications GB 1122183.5, GB 1213297.3 entitled Headlight System Incorporating Adaptive Beam Function or GB 1213299.9, which are hereby incorporated by reference.

A far-field distribution which is formed from a magnified image of the light source.

Magnification of the light source into the far-field beam spot distribution is controlled by the focal length of a projection lens.

A far-field distribution which is formed from an optical projection system comprising an ellipsoidal reflector and projection lens.

An optical projection system formed from an ellipsoidal reflector and projection lens whereby the projection lens is smaller than the reflector.

An optical projection system formed from an ellipsoidal reflector and projection lens whereby the ellipsoidal reflector is smaller than the projection lens.

An optical projection system formed from a hyperbolic reflector and projection lens.

An optical projection system formed from a projection lens.

A further aspect of the present invention provides a vehicle comprising a headlight of the invention.

The invention claimed is:

1. A light source system operable in at least first and second modes to provide at least and first and second different far field illumination patterns, the system comprising:
   a photoluminescent material; and
   a light beam generator for generating, in the first mode, a first set of one or more light beams for illuminating respective first regions of the photoluminescent material and for generating, in the second mode, a second set of one or more light beams for illuminating respective second regions of the photoluminescent material, the first and second sets of one or more light beams being independently controllable, the light beam generator including a laser light source and a non-mechanical optical component, wherein the non-mechanical optical component is arranged to receive light emitted by the laser light source and provide at least some of the received light to the photoluminescent material, and wherein the non-mechanical optical component is an optical fibre or a lens;
   wherein in the first mode, the light beam generator, via the non-mechanical optical component, generates the first set of one or more light beams such that the beam, or a first beam, of the first set of light beams illuminates a first illumination region of the photoluminescent material, which first illumination region has one side that is inclined with respect to another side of the illumination region, and
   wherein, in the second mode, the light beam generator generates the second set of one or more light beams such that the beam, or at least one beam, of the second set of light beams illuminates a second region of the photoluminescent material, which second region has one side that is inclined with respect to another side of the region, the inclined side of the second illumination region being crossed with the inclined side of the first illumination region of the first mode.

2. A system as claimed in claim 1 wherein the second illumination region of the second mode is a mirror image of the first illumination region of the first mode.

3. A system as claimed in claim 1 and operable in a third mode to provide a third far field illumination patterns different from the first and second far field illumination patterns.

4. A system as claimed in claim 3 wherein, in the third mode, the light beam generator generates a third set of light beams for illuminating respective regions of the photoluminescent material, the third set of light beams illuminating the first illumination region and the second illumination region.

5. A system as claimed in claim 1 wherein in the first mode, the light beam generator generates the first set of one or more light beams such that the first illumination region on the photoluminescent material has first and third sides that are inclined with respect to a second side of the region.

6. A system as claimed in claim 5 wherein, in the second mode, the light beam generator generates the second set of one or more light beams such that the first illumination region is not illuminated by the second set of light beams.

7. A system as claimed in claim 5 wherein the light beam generator is adapted to generate light beams that illuminate respective regions of the photoluminescent material, which respective regions have first and third sides that are inclined with respect to a second side, a first group of said light beams being included in the first set of light beams generated in the first mode and a second, different group of said light beams being included in the second set of light beams generated in the second mode.

8. A system as claimed in claim 7 wherein the first and third sides of said regions having first and third sides that are inclined with respect to a second side are parallel to one another.

9. A system as claimed in claim 7 wherein said regions having first and third sides that are inclined with respect to a second side further have a fourth side that is parallel to the second side.

10. A system as claimed in claim 7 where the regions having first and third sides that are inclined with respect to a second side are adjacent to one another.

11. A system as claimed in claim 7 where the regions having first and third sides that are inclined with respect to a second side are arranged such that the second sides of the regions are co-linear with one another.

12. A system as claimed in claim 1 and further comprising an optical system arranged to image light emitted from the photoluminescent material into the far field, the optical system including a reflector and a projection lens, the reflector being arranged to reflect light emitted by the photoluminescent material towards the projection lens.

13. A system as claimed in claim 12 wherein an extent, perpendicular to an optical axis of the light source system, of the reflector is greater than an extent, perpendicular to an optical axis of the light source system, of the projection lens.

14. A light source system as claimed in claim 1 wherein the areas of regions of the photoluminescent material illuminated by respective light beams vary over the area of the photoluminescent material.

15. A light source system as claimed in claim 1 wherein the shapes of regions of the photoluminescent material illuminated by respective light beams vary over the area of the photoluminescent material.

16. A light source system as claimed in claim 1 wherein the light beam generator is adapted to generate an additional set of one or more light beams for illuminating respective additional regions of the photoluminescent material co-located with one or more first regions or one or more second regions of the photoluminescent material.

17. A light source system as claimed in claim 16, wherein the additional regions of the photoluminescent material define one or more alpha-numeric characters.

18. A headlight for a motor vehicle comprising a light source system as defined in claim 1.

19. A vehicle comprising a headlight as defined in claim 18.

* * * * *